(12) United States Patent
Huang et al.

(10) Patent No.: US 9,459,889 B2
(45) Date of Patent: Oct. 4, 2016

(54) SYSTEMS AND METHODS FOR CONTEXT-AWARE APPLICATION CONTROL

(71) Applicant: QUALCOMM Incorporated, San Diego, CA (US)

(72) Inventors: Pengjun Huang, San Diego, CA (US); Fan Deng, San Diego, CA (US); Lei Ma, San Diego, CA (US); Baozhong Zheng, San Diego, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/712,847

(22) Filed: May 14, 2015

(65) Prior Publication Data

US 2015/0331711 A1 Nov. 19, 2015

Related U.S. Application Data

(60) Provisional application No. 62/000,395, filed on May 19, 2014, provisional application No. 62/000,904, filed on May 20, 2014.

(51) Int. Cl.
| | |
|---|---|
| *G06F 13/00* | (2006.01) |
| *G06F 9/445* | (2006.01) |
| *G06F 9/46* | (2006.01) |
| *G06F 9/54* | (2006.01) |
| *G06F 3/0481* | (2013.01) |

(52) U.S. Cl.
CPC ........... *G06F 9/4451* (2013.01); *G06F 3/0481* (2013.01); *G06F 9/466* (2013.01); *G06F 9/542* (2013.01)

(58) Field of Classification Search
CPC .................................................. G06F 9/45512
USPC ........................................................ 719/320
See application file for complete search history.

(56) References Cited

U.S. PATENT DOCUMENTS

| | | |
|---|---|---|
| 8,781,262 B2 | 7/2014 | Rosenblatt |
| 8,867,849 B1 | 10/2014 | Kirkham et al. |
| 2010/0146508 A1 | 6/2010 | Martinez et al. |
| 2011/0081948 A1 | 4/2011 | Shirai et al. |
| 2012/0262582 A1 | 10/2012 | Kimchi et al. |
| 2012/0265528 A1* | 10/2012 | Gruber .................. G10L 15/18 704/235 |
| 2013/0088337 A1 | 4/2013 | Blanchflower et al. |

(Continued)

OTHER PUBLICATIONS

Dey A.K., et al.,"Context Awareness and Mobile Devices", In the Handbook of Research on User Interface Design and Evaluation for Mobile Technology Ed., IGI Global, 2008, XP055206926, pp. 205-217.

(Continued)

*Primary Examiner* — Andy Ho
(74) *Attorney, Agent, or Firm* — Austin Rapp & Hardman

(57) ABSTRACT

A method performed by an electronic device is described. The method includes obtaining sensor information. The method also includes identifying a class of an object based on the sensor information. The method further includes determining one or more actions based on the sensor information, the class of the object and an action usage history. The method additionally includes performing at least one of the one or more actions based on at least one application.

24 Claims, 24 Drawing Sheets

(56) References Cited

U.S. PATENT DOCUMENTS

| | | | |
|---|---|---|---|
| 2013/0129142 A1 | 5/2013 | Miranda-Steiner | |
| 2014/0149060 A1* | 5/2014 | Meduna | G06F 1/3206 702/94 |
| 2014/0181256 A1 | 6/2014 | Trifa et al. | |
| 2015/0031347 A1* | 1/2015 | Kim | H04M 1/0245 455/418 |
| 2015/0277568 A1* | 10/2015 | Veeramani | G06F 3/0416 345/173 |

OTHER PUBLICATIONS

International Search Report and Written Opinion—PCT/US2015/031143—ISA/EPO—Aug. 19, 2015.

Qualcomm Retail Solutions, Inc., "The Gimbal Context Aware Platform—Digital Insights into the Physical World", Revision 1, Nov. 2013, 9 pages XP055185249.

* cited by examiner

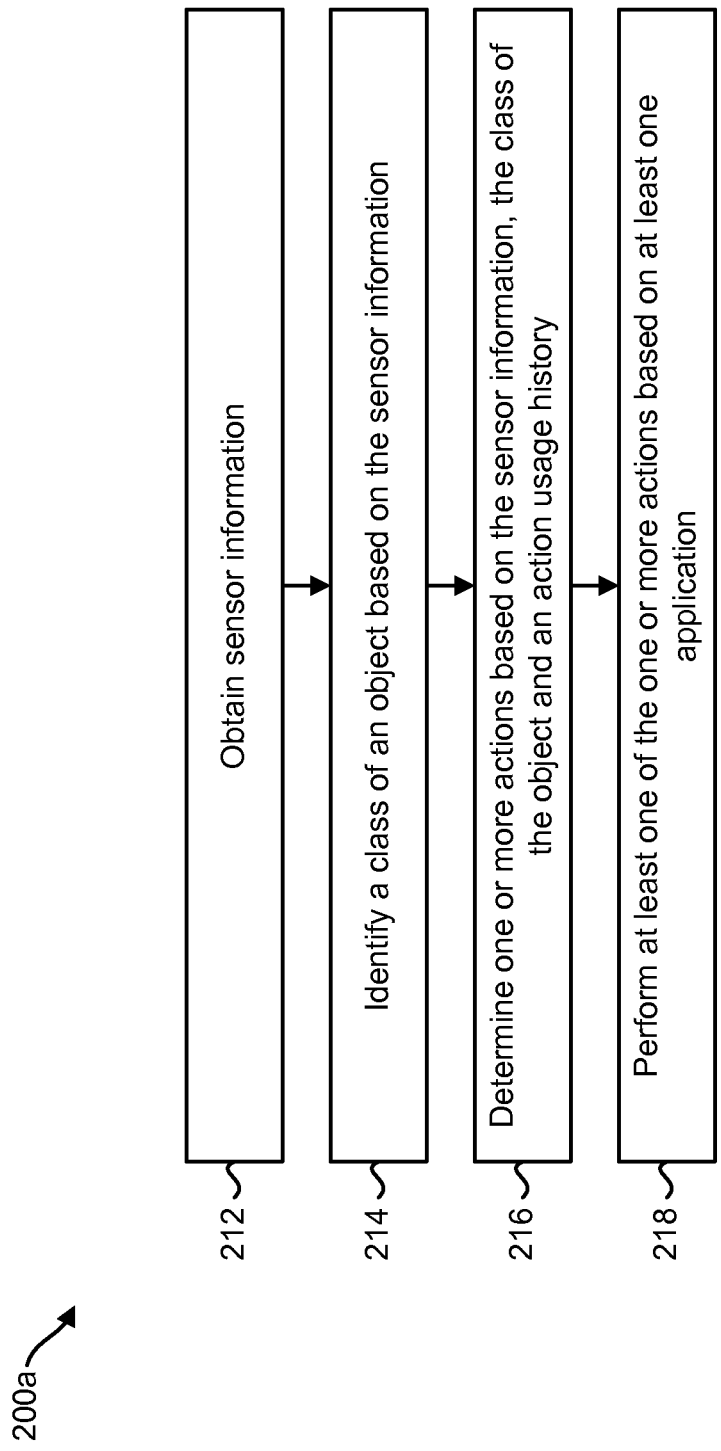

SYSTEMS AND METHODS FOR CONTEXT-AWARE APPLICATION CONTROL

RELATED APPLICATIONS

This application is related to and claims priority to U.S. Provisional Patent Application Ser. No. 62/000,904, filed May 20, 2014, for "AUTOMATIC OBJECT DETECTION FOR APPLICATION SPECIFIC OBJECTS" and to U.S. Provisional Patent Application Ser. No. 62/000,395, filed May 19, 2014, for "CONTEXT-BASED APPLICATION PREDICTION."

TECHNICAL FIELD

The present disclosure relates generally to electronic devices. More specifically, the present disclosure relates to systems and methods for context-aware application control.

BACKGROUND

In the last several decades, the use of electronic devices has become more common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smartphones, computers, televisions, gaming systems, etc.) utilize one or more sensors. For example, a smartphone may detect touch inputs with a touch sensor and capture digital images utilizing an image sensor.

However, electronic device responsiveness is often inefficient and cumbersome. For example, an electronic device may require many button pushes and/or touch inputs to access and/or perform a simple task. As can be observed from this discussion, systems and methods that improve electronic device responsiveness may be beneficial.

SUMMARY

A method performed by an electronic device is described. The method includes obtaining sensor information. The method also includes identifying a class of an object based on the sensor information. The method further includes determining one or more actions based on the sensor information, the class of the object and an action usage history. The method additionally includes performing at least one of the one or more actions based on at least one application.

Performing at least one of the one or more actions may include running a dialer application, running a text message application and/or running a contacts application when the class of the object is a phone number. Performing at least one of the one or more actions may include running a browser application when the class of the object is a Uniform Resource Locator (URL). Performing at least one of the one or more actions may include running a map application when the class of the object is an address.

Performing at least one of the one or more actions may include running an e-mail application when the class of the object is an e-mail address. Performing at least one of the one or more actions may include running a note application when the class of the object is generic text. Performing at least one of the one or more actions may include running a document writer application when the class of the object is a whiteboard object.

The sensor information may include image information, location information, motion information and/or ambient light information. The sensor information may include image information. The method may include performing object detection based on the image information to indicate the object.

Performing at least one of the one or more actions may include selecting, from a database, one or more highest ranked actions.

Determining the one or more actions may be based on temporal information. The action usage history may include a record of actions performed with contextual information.

The method may include ranking the one or more actions based on the class of the object. The method may include ranking the one or more actions based on the action usage history. The method may include ranking the one or more actions by associating weights based on a number of times an action is performed according to the action usage history and a number of times the class of the object is used to perform the action.

An electronic device configured to provide a context-aware application is also described. The electronic device includes a processor configured to obtain sensor information, to identify a class of an object based on the sensor information, to determine one or more actions based on the sensor information, the class of the object and an action usage history, and to perform at least one of the one or more actions based on at least one application. The electronic device also includes a memory in electronic communication with the processor, wherein the memory is configured to store the action usage history.

The processor may be configured to run a search application when the class of the object is a grocery item. The processor may be configured to run a banking application when the class of the object is banking information. The processor may be configured to run a payment application when the class of the object is payment information. The processor may be configured to run a contacts application, a dialer application, a text messaging application and/or a search application when the class of the object is a face. The processor may be configured to run a search application, a contacts application, a dialer application, a text messaging application and/or a browser when the class of the object is a barcode.

The sensor information may include image information, location information, motion information and/or ambient light information. The sensor information may include image information. The processor may be configured to perform object detection based on the image information to indicate the object. The electronic device may include a display in electronic communication with the processor. The display may be configured to present an image corresponding to the image information. The electronic device may be a wireless communication device, an automobile, a drone or a robot.

An apparatus is also described. The apparatus includes means for obtaining sensor information. The apparatus also includes means for identifying a class of an object based on the sensor information. The apparatus further includes means for determining one or more actions based on the sensor information, the class of the object and an action usage history. The apparatus additionally includes means for performing at least one of the one or more actions based on at least one application. The means for determining the one or more actions may be based on temporal information. The action usage history may include a record of actions performed with contextual information.

The apparatus may include means for ranking the one or more actions based on the class of the object. The apparatus may include means for ranking the one or more actions based on the action usage history. The apparatus may include means for ranking the one or more actions by associating weights based on a number of times an action is performed according to the action usage history and a number of times the class of the object is used to perform the action.

BRIEF DESCRIPTION OF THE DRAWINGS

FIG. 2A is a flow diagram illustrating one configuration of a method 200a for context-aware application control;

DETAILED DESCRIPTION

An electronic device may include one or more sensors. For example, an electronic device may include an image sensor, ambient light sensor, location (e.g., Global Positioning System (GPS)) sensor, motion sensor, touch sensor, heat sensor, pressure sensor, barometric pressure sensor and/or tilt sensor, etc. It may be desirable to utilize the one or more sensors for context-aware application control. For instance, some mobile cameras are capable of taking high-quality pictures. While a high-quality camera may be desirable, a smart camera may also be desirable. As technology becomes "smarter," it may be desirable to have a sensor that is "context-aware" smart. For example, a GPS sensor may be utilized to determine a location, a motion sensor may be utilized to determine what a user is doing and an image sensor (e.g., camera) may be utilized to determine what a user is seeing and why. One or more sensors utilized in combination with technologies such as text detection and recognition, face recognition, whiteboard detection and/or traffic sign detection, etc., may serve as a connection between the digital world and the outside world.

In some configurations of the systems and methods disclosed herein, a camera may be utilized as an entrance to control an electronic device (e.g., smartphone, mobile phone, gaming system, etc.). For example, an image sensor (e.g., camera) may be utilized to "read" the contents of one or more preview frames. This may improve application access efficiency. Some electronic devices may include a physical camera button that allows quick access to a camera, for instance. The camera could be utilized to go directly to a specific application process. This may be much quicker compared to following the steps: unlocking the device, opening a specific application, accessing the camera and then proceeding to the specific application process. Accordingly, interaction efficiency may be increase. In particular the systems and methods disclosed herein may improve access to relevant applications with reduced user input. For example, a user's smartphone may detect a business card with a phone number in a preview image from a camera. The user may simply touch a phone call indicator, at which point the smartphone may call the number. Thus, user interaction may be reduced to very few inputs to accomplish a task. This contrasts with other scenarios where a user must open a phone application and type in the phone number before initiating a call. Also, with more devices becoming wearable, cameras will stay with developing devices, though a touchscreen may not. However, some configurations of the systems and methods disclosed herein may enable launching applications even without a touchscreen.

Figure 1:
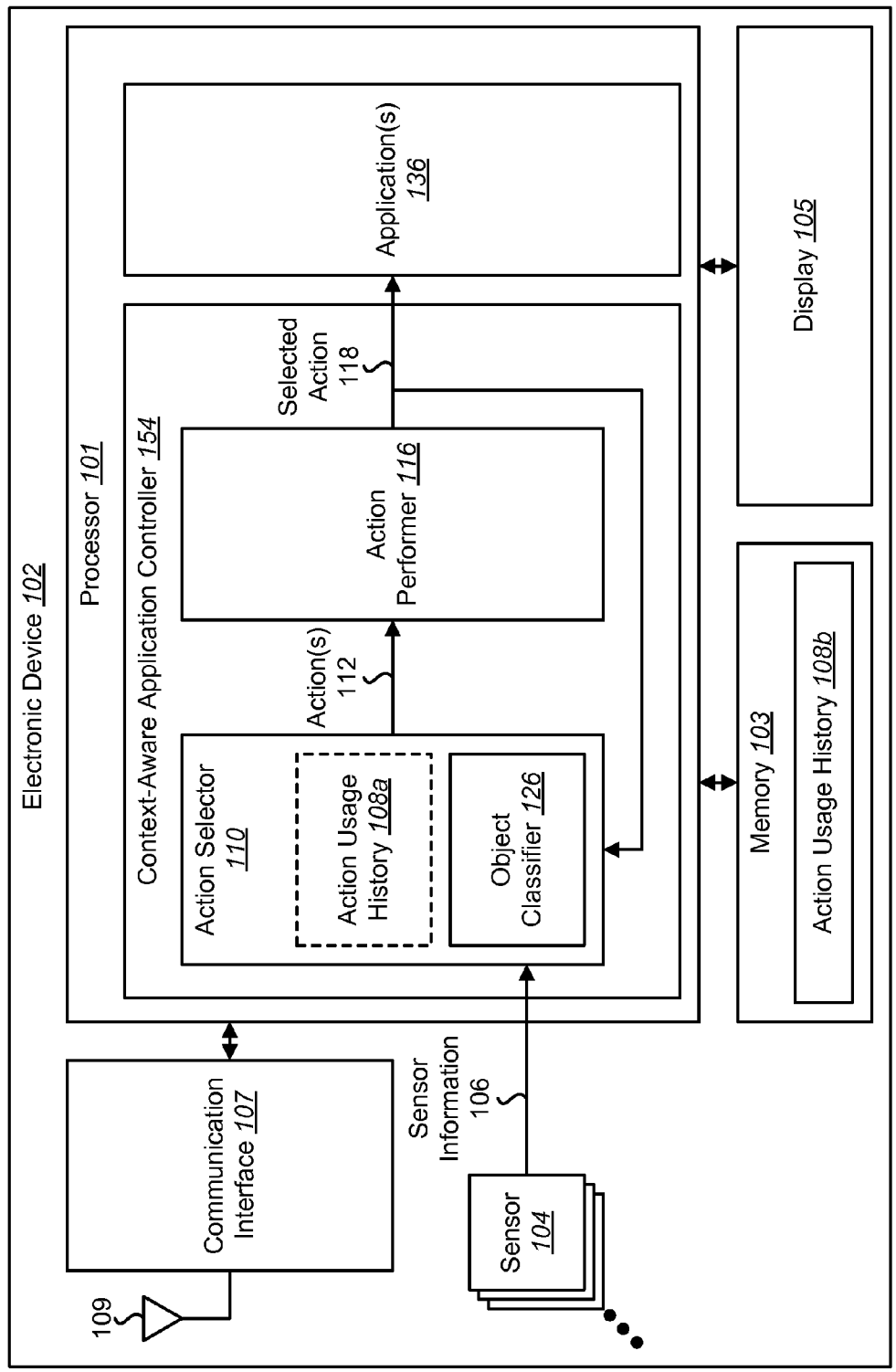
FIG. 1 is a block diagram illustrating one configuration of an electronic device in which systems and methods for context-aware application control may be implemented.

FIG. 1 is a block diagram illustrating one configuration of an electronic device 102 in which systems and methods for context-aware application control may be implemented. Examples of the electronic device 102 include wireless communication devices, laptop computers, desktop computers, cellular phones, smartphones, wireless modems, e-readers, tablet devices, gaming systems, televisions, appliances, automobiles (e.g., automobile consoles), unmanned aerial vehicles (UAVs) (e.g., drones), etc. In some configurations, the electronic device 102 may be referred to as a wireless communication device, a mobile device, mobile station, subscriber station, client, client station, user equipment (UE), remote station, access terminal, mobile terminal, terminal, user terminal, subscriber unit, etc. The electronic device 102 may include one or more sensors 104, a processor 101, a memory 103, a display 105, a communication interface 107 and/or one or more antennas 109. One or more of the sensors 104, the memory 103, the display and the communication interface 107 may be coupled to (e.g., in electronic communication with) the processor 101. The processor 101 may include and/or implement a context-aware application controller 154, an action selector 110 and/or an action performer 116. One or more of the components of the electronic device may be implemented in hardware or in a combination of hardware and software. It should be noted that one or more of the components or elements of the electronic device 102 may be optional in some configurations. For example, some configurations of the electronic device 102 may not include an antenna 109, communication interface 107 and/or a display 105.

It should be noted that the memory 103 may store information or data. The processor may access (e.g., read data from, write data to, etc.) the memory 103. For example, an action usage history 108b may be stored in the memory 103. The processor 101 (e.g., the action selector 110) may access (e.g., include) all or part of the action usage history 108a. It should be noted that while action usage history 108b may be stored in memory and all or a portion of the action usage history 108a may be accessed by the processor 101, the action usage history may be generically referred to with the element label "108" for clarity.

The one or more sensors 104 may obtain sensor information 106. For example, the one or more sensors 104 may sense or detect information regarding the situation, surroundings and/or status of the electronic device 102. Examples of the one or more sensors 104 include one or more image sensors (e.g., cameras), audio sensors (e.g., microphones), ambient light sensors, location (e.g., Global Positioning System (GPS), Wi-Fi positioning system, etc.) sensors, motion sensors (e.g., accelerometers), touch sensors, heat sensors, pressure sensors, proximity sensors, barometric pressure sensors and/or tilt sensors, etc. The one or more sensors 104 may generate sensor information 106. Sensor information 106 may indicate information regarding the situation, surroundings and/or status of the electronic device 102. For example, the sensor information 106 may include image information (e.g., pixel data), audio information, location information (e.g., coordinates, latitude and longitude, etc.), motion information, ambient light information, device pressure (e.g., a force exerted on the electronic device 102) information, barometric pressure information and/or orientation information (e.g., electronic device tilt, device pointing direction, camera pointing direction, etc.), etc. The sensor information 106 may be provided to the action selector 110.

The context-aware application controller 154 may include the action selector 110 and the action performer 116. The context-aware application controller 154 may control one or applications 136 based on a context of the electronic device 102. A "context" may be a status of surroundings and/or situation of the electronic device 102. For example, a "context" may relate to the circumstances in which the electronic device 102 exists (e.g., what object(s) are near the device and/or detected by the device, where the electronic device 102 is located, when the electronic device 102 is in operation, how the electronic device 102 is being utilized, why the electronic device 102 is being utilized, what conditions surround the electronic device 102 and/or by whom the electronic device 102 is being utilized).

The action selector 110 may determine one or more actions 112 based on the sensor information 106, action usage history 108 and/or a class of an object (e.g., identified object). As described above, the sensor information 106 may provide an indication of the context of the electronic device 102. An object may include one or more items and/or information. Examples of objects include text, characters, words, structures, items, faces, buildings, people, signs, containers, codes, audio information, video information, location information, motion information, orientation information, etc. A class of an object may be an attribute, type and/or category of an object. Examples of classes include phone number, email address, geographic address (e.g., street address), Internet address, generic text, language, brand, name, product type, celebrity status, speaker identity, speaker gender, expression, emotion, music, geographic region (e.g., country, state, city, etc.), indoors, outdoors, route and motion pattern (e.g., walking, jogging, running, biking, riding, traveling, skiing, etc.).

In some configurations, for example, image information may indicate (e.g., include one or more images of) one or more objects. The action selector 110 (e.g., the object classifier 126 and/or a separate module) may perform object detection on the image information. For example, the object detection may detect (e.g., identify) objects such as text, symbols, faces, people, signs, product containers (e.g., boxes, bottles, cartons, etc.), structures (e.g., buildings, roads, bridges), vehicles, bar codes, Quick Response (QR) codes, etc. In some configurations, the action selector 110 (e.g., the object classifier 126 and/or a separate module) may classify one or more detected objects. For text objects, for example, the text may be classified as a phone number, email address, street address, product name, product brand, Uniform Resource Locator (URL), Internet address (e.g., web link), street sign, business sign, book text, name, title, International Standard Book Number (ISBN) and/or media information (e.g., movie title, song title, artist name, television program name, etc.), etc. Text objects may additionally or alternatively be classified according to language (e.g., English, Spanish, German, Japanese, Chinese, Russian, etc.). For symbols, for example, a symbol may be classified as a product brand, product name, business sign, flag and/or company name, etc. For faces, for example, a face may be classified as a celebrity face, a non-celebrity face, by gender and/or by expression (e.g., happy, sad, excited, tired, etc.), etc. Many other classes and/or sub-classes may be utilized.

In some configurations, for example, the action selector 110 (e.g., the object classifier 126 and/or a separate module) may perform audio recognition on the audio information and/or classify the audio information. For example, the audio recognition may detect (e.g., identify, recognize, etc.) information such as speech, speaker identity (e.g., electronic device 102 user, celebrity, non-celebrity, etc.), speaker gender, expression (e.g., happy, sad, excited, tired, etc.), music, media soundtrack, product jingles, sound effects, spoken information (e.g., phone number, email address, street address, product name, product brand, Internet address (e.g., web link), name, title and/or media information (e.g., movie title, song title, artist name, television program name, etc.)), etc. Audio information may additionally or alternatively be classified according to language (e.g., English, Spanish, German, Japanese, Chinese, Russian, etc.). Many other classes and/or sub-classes may be utilized.

In some configurations, for example, the action selector 110 (e.g., the object classifier 126 and/or a separate module) may perform location recognition on the location information and/or classify the location information. For example, the action selector 110 (e.g., the object classifier 126 and/or a separate module) may determine whether the electronic device 102 is in a particular country, state, city, county, town, park and/or recreational area (e.g., national park, tourist attraction, wilderness area, beach, ski resort, etc.), etc. Additionally or alternatively, the action selector 110 may determine whether the electronic device 102 is nearby or inside of a structure (e.g., business such as a mall, restaurant, grocery store, retail store, etc.). Additionally or alternatively, the action selector 110 (e.g., the object classifier 126 and/or a separate module) may determine whether the electronic device 102 is traveling along a particular route (e.g., road, highway, interstate, trail, etc.). Many other classes and/or sub-classes may be utilized.

In some configurations, for example, the action selector 110 (e.g., the object classifier 126 and/or a separate module) may perform motion recognition on the motion information and/or classify the motion information. For example, the action selector 110 (e.g., the object classifier 126 and/or a separate module) may determine whether the user of the electronic device 102 is walking, jogging, running, exercising and/or traveling (in a car, train, boat, airplane, etc.), etc. Many other classes and/or sub-classes may be utilized.

In some configurations, the electronic device 102 may include a clock (not shown in FIG. 1). The clock may indicate temporal information (e.g., time of day, day of the week, month, year, etc.). The temporal information may be provided to the action selector 110 in some configurations.

The action selector 110 may determine the one or more actions 112 based on the sensor information 106 (e.g., the class(es) of one or more kinds of objects (sensor information 106 and/or items)). For example, the action selector 110 may map the sensor information 106 to one or more actions 112. In some configurations, the action selector 110 may include and/or maintain mapping information (e.g., a mapping table) that indicates a correspondence between the sensor information 106 (e.g., the class(es) of one or kinds of objects (sensor information 106 and/or items) and one or more actions. For example, a phone number may map to a contact creation/updating action, jogging may map to an exercise tracking action and/or music playing action, a web address may correspond to a web browsing action, a high (or low) temperature may map to a weather checking action, detected music may map to a media browsing action and/or a restaurant location may map to a menu retrieval/display action. Each of the actions may correspond to one or more applications 136 (e.g., programs). In some configurations, the mapping may be indicated in a database. The database may include, for example, one or more sensor information 106 classes, one or more corresponding actions and/or one or more corresponding applications 136.

In some configurations, the action selector 110 may additionally or alternatively determine the one or more actions 112 based on action usage history 108. The action usage history 108 may include a record of actions selected, actions performed and/or contextual information. The contextual information may include one or more of sensor information 106, one or more classes of the sensor information 106 and temporal information. For instance, the action usage history 108 may include statistics of selected actions in connection with the contextual information. In one example, the action usage history 108 may indicate a number of times an action has been performed and/or a number of times a class of an object has been used to perform an action. For example, the action usage history 108 may indicate a number of times that the electronic device 102 has played music while a user is jogging on Monday, Wednesday and Thursday. In another example, the action usage history 108 may indicate that the electronic device 102 adds unrecognized phone numbers to contact information. In yet another example, the action usage history 108 may indicate that the electronic device 102 searches for coupons with a coupon application 136 or a web browser when grocery products are detected at a grocery store. The action selector 110 may update the action usage history 108 when an action is performed and/or when an object is used to perform an action. In some configurations, the action usage history 108 may be expressed as a number of times that an action is performed, that an object is used to perform an action, that the user has selected a particular action and/or application 136 when a particular object is detected, when at a particular location (e.g., within a range from a location), at a particular time (e.g., within one or more discrete time segments), when moving in a particular way, etc. Additionally or alternatively, the action usage history 108 may indicate a number of times that a particular action has not been performed and/or that an object has not been used to perform an action. This information may be used to lower a rank, for example.

Additionally or alternatively, the context-aware application controller 154 (e.g., the action selector 110) may determine a "scene" based on the sensor information in some configurations. The "scene" may be a classification of the context. A scene may be indicated by a set of conditions derived from the sensor information 106. For example, location information may indicate a grocery store and image detection may indicate multiple kinds and brands of cereal. In this case, the "scene" may be classified as grocery shopping for cereal. The action usage history 108 may associate one or more actions with a particular scene. For example, the action usage history 108 may record how often a user accesses a coupon application 136 while shopping for cereal. Accordingly, the action selector 110 may prioritize determining one or more relevant actions and/or applications 136 when the conditions for the "scene" are met.

In some configurations, the action selector 110 may rank actions. For example, the action selector 110 may rank one or more actions based on the class of the object. In particular, the action selector 110 may rank actions higher that are more applicable to that class of object. For example, when the object class is a URL, a browsing action (e.g., running a browser with the URL) may be ranked higher than a note taking application 136.

Additionally or alternatively, the action selector 110 may rank one or more actions based on the action usage history 108. In particular, the action selector 110 may rank actions higher that are performed more times in a particular context (for a particular class of object, for example). For example, if dialing a phone number has occurred more times than adding the phone number to contacts, the dialing action (with the dialer application 136, for example) may be ranked higher than a contact adding action (with a contacts application 136, for example).

In some configurations, ranking the one or more actions may be accomplished by associating weights with an action. The weights may be determined based on a number of times an action is performed in accordance with the action usage history 108 and/or a number of times the class of the object is used to perform an action. Accordingly, greater weights may be given to actions that are performed more times and/or that are associated with an object class that has been used more times.

In some configurations, the action selector 110 may additionally or alternatively rank actions in accordance with a probability that the actions will be selected for a context. For example, the action selector 110 may calculate action selection probabilities corresponding to one or more actions. Each action selection probability may be calculated based on the sensor information 106 (e.g., sensor information 106 class(es)) and the action usage history 108.

In some configurations, the action selector 110 may calculate the action selection probability based on a user preference setting, the sensor information 106 (e.g., class(es) of sensor information 106) and/or the action usage history 108. For example, the electronic device 102 may receive an indication of a user preference for some particular action (in a context, for example). For instance, the electronic device 102 may receive an indication (via a touchscreen, keyboard, microphone, etc.) that a user prefers to select an exercise tracking action when jogging. Accordingly, the action selector 110 may factor in the user preference setting when calculating the action selection probability to increase the calculated probability that the user will select an exercise tracking action when jogging. In some configurations, this may cause the user preferred action to be ranked above one or more other actions (e.g., playing music, showing device location on a map, etc.).

The action selector 110 may provide one or more of the actions corresponding to (e.g., mapped to) the sensor information 106 (e.g., sensor information 106 class(es)) as the one or more actions 112. In some configurations, one or more of the action(s) 112 may be communicated (e.g., displayed, indicated with audio (e.g., read as speech, with an audio chime, etc.) to a user. For example, the electronic device 102 may present an indicator of one or more of the actions 112 as a button, icon and/or text on a display 105 (e.g., touch screen).

The one or more actions 112 may be provided to the action performer 116. The action performer 116 may perform at least one of the one or more actions 112 based on at least one application 136. For example, the action performer 116 may select one or more actions 118. The action performer 116 may run (e.g., open, call and/or execute) one or more applications 136 to perform one or more selected actions 118. More generally, the electronic device 102 may perform the selected action 118. For example, the electronic device 102 may perform the selected action 118 by opening (or switching to) an application 136 that performs the selected action 118 and performing the selected action 118 with the application 136.

In some configurations, the electronic device 102 (e.g., context-aware application controller 154, action performer 116) may select an action based on a received input (e.g. user input). For example, the electronic device 102 may receive a user input (e.g., a tap and/or swipe on a touch screen, a mouse click event, a speech recognition input, a motion input, a tilt input, etc.) that indicates a particular action. For instance, the electronic device 102 may detect that a user has tapped some text or an icon that indicates a particular action. The action indicated by the user input may be one or more of the actions 112 or other action(s). The action performer 116 may indicate the selected action 118 to the action selector 110. It should be noted that in some configurations and/or instances, the action performer 116 may select one or more actions 112 without a user input that indicates a particular action.

As mentioned above, the action selector 110 may update the action usage history 108 based on the selected action 118. For example, the action selector 110 may record the selected action 118 (e.g., update a count corresponding to the selected action 118) with the corresponding contextual information (e.g., sensor information 106, information based on the sensor information 106 (e.g., one or more object classes, detected/recognized objects, recognized speech, etc.)) and/or temporal information. In some cases, the action usage history 108 may not include an existing (e.g., previous) record of the selected action 118. In these cases, the action usage history 108 may create a new action in the action usage history 108 to reflect the new selected action 118. In this way, the action selector 110 may flexibly update the action usage history 108 to more closely reflect a user's behavior. Accordingly, the action(s) 112 may be more relevant to a user (particularly as more action usage history 108 is collected, for example).

As described above, one or more of the components or elements of the electronic device 102 may be implemented in a combination of hardware and software. For clarity, some more specific examples of implementations of the electronic device 102 are given as follows in terms of a computer-program product. For example, the electronic device 102 may be implemented as a computer-program product for context-aware application control. The computer-program product may include a non-transitory computer-readable medium with instructions. The instructions may include code for causing the electronic device 102 to obtain sensor information. The instructions may also include code for causing the electronic device 102 to identify a class of an object based on the sensor information. The instructions may further include code for causing the electronic device 102 to determine one or more actions based on the sensor information, the class of the object and/or an action usage history. The instructions may additionally include code for causing the electronic device 102 to perform at least one of the one or more actions based on at least one application 136. The action usage history may include a record of actions performed with contextual information. In some configurations, the instructions may include code for causing the electronic device 102 to rank the one or more actions based on the class of the object. Additionally or alternatively, the instructions may include code for causing the electronic device 102 to rank the one or more actions based on the action usage history.

In some configurations, the instructions for causing the electronic device 102 to perform at least one of the one or more actions may include one or more of the following, for example. The instructions may include code for causing the electronic device 102 to run a dialer application 136, a text message application 136 and/or a contacts application 136 when the class of the object is a phone number. The instructions may include code for causing the electronic device 102 to run a browser application 136 when the class of the object is a Uniform Resource Locator (URL). The instructions may include code for causing the electronic device 102 to run a map application 136 when the class of the object is an address. The instructions may include code for causing the electronic device 102 to run an e-mail application 136 when the class of the object is an e-mail address. The instructions may include code for causing the electronic device 102 to run a note application 136 when the class of the object is generic text. The instructions may include code for causing the electronic device 102 to run a document writer application 136 when the class of the object is a whiteboard object. The instructions may include code for causing the electronic device 102 to run a search application 136 when the class of the object is a grocery item. The instructions may include code for causing the electronic device 102 to run a banking application 136 when the class of the object is banking information (e.g., an account number, Magnetic Ink Character Recognition (MICR) number, a credit card number, debit card number, etc.). The instructions may include code for causing the electronic device 102 to run a payment application 136 (e.g., near-field communication (NFC) payment application 136, payment management application 136, etc.) when the class of the object is payment information (e.g., an account number, Magnetic Ink Character Recognition (MICR) number, a credit card number, debit card number, etc.). The instructions may include code for causing the electronic device 102 to run a contacts application 136, a dialer application 136, a text messaging application 136 and/or a search application 136 when the class of the object is a face. The instructions may include code for causing the electronic device 102 to run a search application 136, a contacts application 136, a dialer application 136, a text messaging application 136 and/or a browser when the class of the object is a barcode.

The display 105 may present one or more images. For example, the display 105 may present an image corresponding to image information. For instance, the display may present an image sensor input, which may include one or more objects (e.g., faces, structures, text, etc.). In some configurations, the display 105 may present a user interface for interaction. For example, the display 105 may present one or more buttons, icons, text, links, etc. For instance, the electronic device 102 may receive user input via a touchscreen display 105.

The communication interface 107 may enable the electronic device 102 to communicate with one or more other electronic devices. For example, the communication interface 107 may provide an interface for wired and/or wireless communications. In some configurations, the communication interface 107 may be coupled to one or more antennas 109 for transmitting and/or receiving radio frequency (RF) signals. In some configurations, electronic device 102 may download information via the communication interface 107. For example, the electronic device 102 may download one or more actions for use by the context-aware application controller 154. Additionally or alternatively, the electronic device 102 may download one or more modules for use by a machine learner. Additionally detail regarding registering and/or unregistering one or more actions and/or modules is given in connection with FIG. 4.

FIG. 2A is a flow diagram illustrating one configuration of a method 200a for context-aware application control. The electronic device 102 may perform the method 200a in some configurations. The electronic device 102 may obtain 212 sensor information 106. This may be accomplished as described in connection with one or more of FIGS. 1 and 3.

For example, the electronic device 102 may obtain image information (e.g., pixel data), audio information, location information (e.g., coordinates, latitude and longitude, etc.), motion information, ambient light information, device pressure (e.g., a force exerted on the electronic device 102) information, barometric pressure information and/or tilt information (e.g., electronic device orientation information), etc.

The electronic device 102 may identify 214 a class of an object based on the sensor information. This may be accomplished as described in connection with one or more of FIGS. 1 and 3. For example, the electronic device 102 may perform one or more of the classification functions described in connection with FIG. 1 (e.g., the object classifier 126). Additionally or alternatively, identifying 214 the class of an object may be performed as described in connection with FIG. 3 (e.g., the object classifier 326). Identifying 214 the class of an object may accordingly include classifying an item and/or information.

The electronic device 102 may determine 216 one or more actions 112 based on the sensor information 106, the class of the object and/or the action usage history 108. This may be accomplished as described in connection with one or more of FIGS. 1 and 3. For example, the electronic device 102 may determine one or more actions 112 that correspond to the sensor information 106 (e.g., one or more detected objects, a location, a detected motion, etc.) and/or temporal information in accordance with action usage history 108. In some configurations, determining 216 the one or more actions 112 may also be based on user preference settings as described herein.

The electronic device 102 may perform 218 at least one of the one or more actions 112. This may be accomplished as described above in connection with FIG. 1. For example, the electronic device 102 may open (or switch to) an application 136 that performs a selected action 118 and may perform the selected action 118 with the application 136.

In some configurations, the electronic device 102 may update the action usage history 108 based on the selected action 118. This may be accomplished as described above in connection with FIG. 1. For example, the electronic device 102 may record the selected action 118 (e.g., a number of times the selected action 118 has been performed) with the corresponding contextual information.

It should be noted that in some configurations, one or more steps of the method 200a may be performed upon transitioning (e.g., automatically transitioning or transitioning based on a user input) from a sleep state to an awake state and/or from a locked state to an unlocked state on the electronic device 102. For example, the electronic device 102 may transition from a sleep state to an awake state and/or from a locked state to an unlock state. The electronic device 102 may trigger one or more of the steps of the method 200a in response to one or more of these events.

Figure 2B:
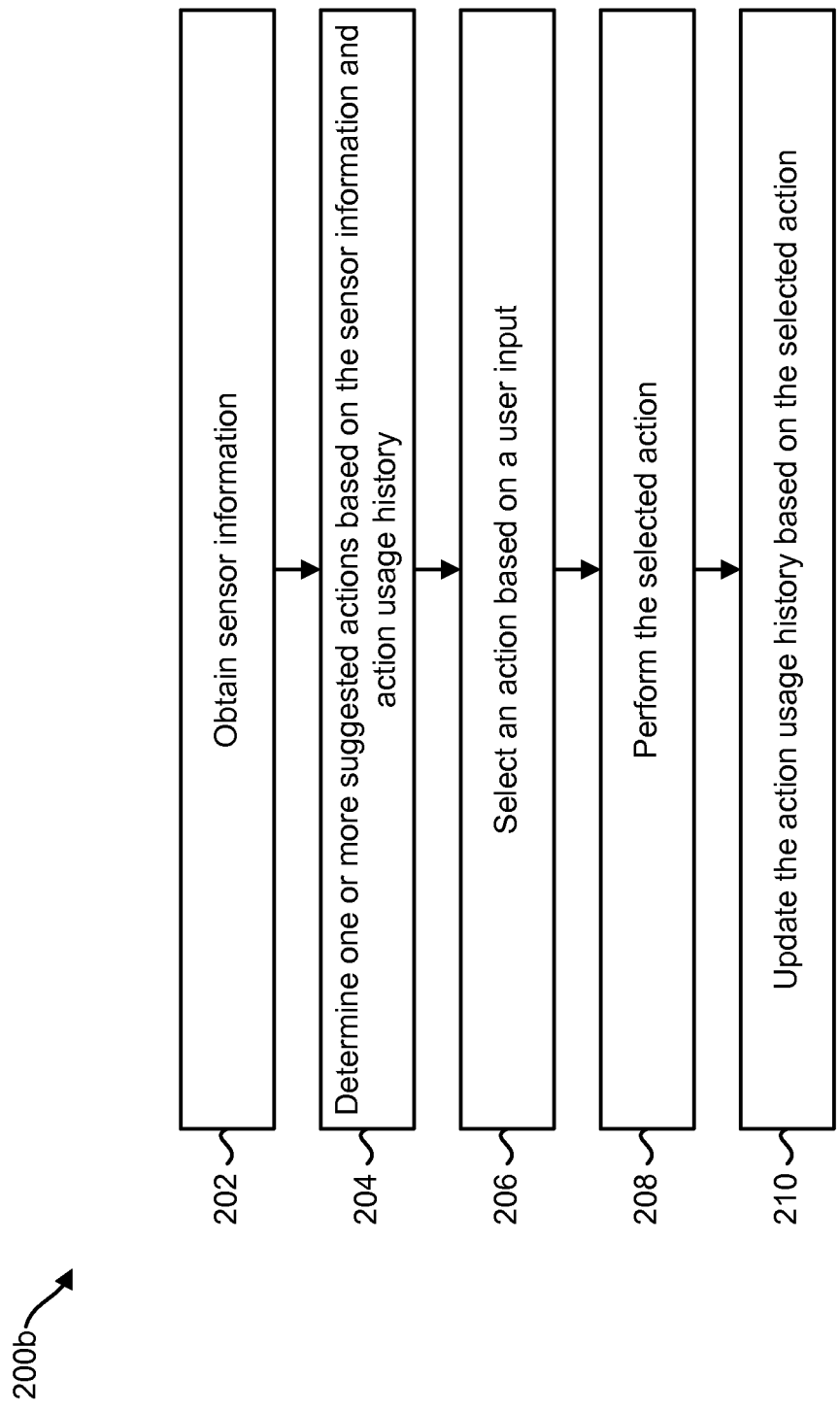
FIG. 2B is a flow diagram illustrating another configuration of a method 200b for context-aware application control.

FIG. 2B is a flow diagram illustrating another configuration of a method 200b for context-aware application control. The electronic device 102 may perform the method 200b in some configurations. The electronic device 102 may obtain 202 sensor information 106. This may be accomplished as described in connection with one or more of FIGS. 1, 2A and 3.

The electronic device 102 may determine 204 one or more actions 112 based on the sensor information 106 and/or action usage history 108. This may be accomplished as described in connection with one or more of FIGS. 1, 2A and 3. For example, the electronic device 102 may determine one or more actions 112 that correspond to the sensor information 106 (e.g., one or more detected objects, a location, a detected motion, etc.) and/or temporal information in accordance with action usage history 108. In some configurations, determining 204 the one or more actions 112 may also be based on user preference settings as described above.

In some configurations, the electronic device 102 may select 206 an action based on a user input. This may be accomplished as described in connection with one or more of FIGS. 1 and 3. For example, the electronic device 102 may select 206 one or more of the actions 112 and/or one or more other actions as indicated by the user input.

The electronic device 102 may perform 208 the selected action 118. This may be accomplished as described in connection with one or more of FIGS. 1, 2A and 3. For example, the electronic device 102 may open (or switch to) an application 136 that performs the selected action 118 and may perform the selected action 118 with the application 136.

The electronic device 102 may update 210 the action usage history 108 based on the selected action 118. This may be accomplished as described above in connection with one or more of FIGS. 1 and 3. For example, the electronic device 102 may record the selected action 118 (e.g., a number of times the selected action 118 has been performed) and/or corresponding contextual information.

Figure 3:
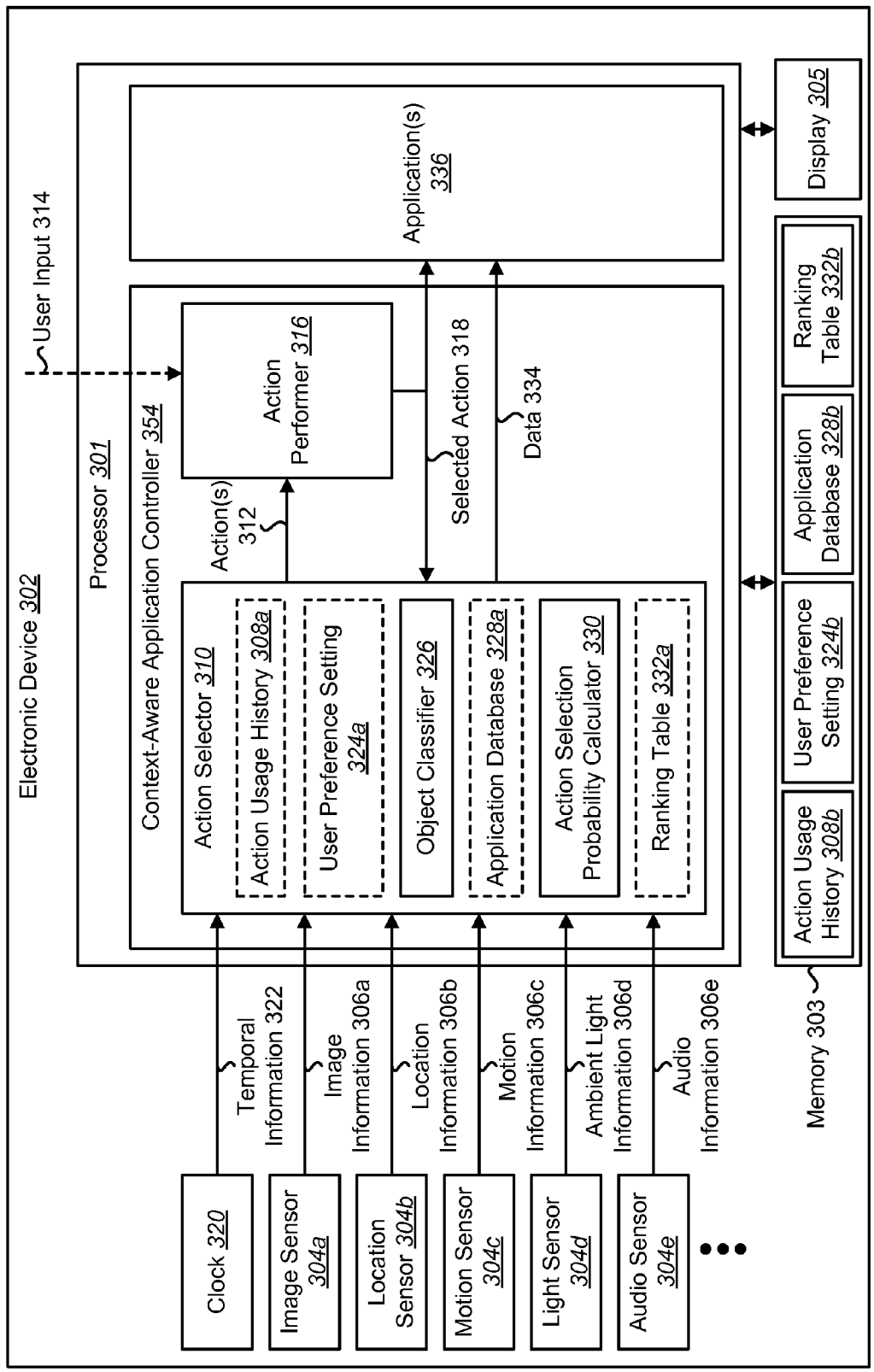
FIG. 3 is a block diagram illustrating a more specific example of an electronic device in which systems and methods for context-aware application control may be implemented.

FIG. 3 is a block diagram illustrating a more specific example of an electronic device 302 in which systems and methods for context-aware application control may be implemented. The electronic device 302 may be one example of the electronic device 102 described in connection with FIG. 1. The electronic device 302 may include a clock 320, one or more sensors 304*a-e*, a processor 301, a memory 303 and/or a display 305. The processor 301 may include and/or implement a context-aware application controller 354, an action selector 310, an action performer 316 and/or one or more applications 336. One or more of the components or elements of the electronic device 302 may be examples of corresponding components or element of the electronic device 102 described in connection with FIG. 1. For example, the context-aware application controller 354 may be one example of the context-aware application controller 154 described in connection with FIG. 1.

The memory 303 may store information or data as described above in connection with FIG. 1. For example, one or more of an action usage history 308*b*, a user preference setting 324*b*, an application database 328*b* and a ranking table 332*b* may be stored in the memory 303. The processor 101 (e.g., the action selector 110) may access (e.g., include) all or part of one or more of the one or more of an action usage history 308*a*, user preference setting 324*a*, application database 328*a* and ranking table 332*a*. These elements may be referred to with generic numerical labels (without "a" or "b") for clarity.

The electronic device 302 may include a clock 320. The clock may indicate temporal information 322 (e.g., time of day, day of the week, month, year, etc.). The temporal information 322 may be provided to the action selector 310. As illustrated in FIG. 3, the electronic device 302 may include an image sensor 304*a*, a location sensor 304*b*, a motion sensor 304*c*, a light sensor 304*d* (e.g., ambient light sensor) and/or an audio sensor 304*e* (e.g., one or more microphones). It should be noted that one or more of the clock 320 and sensors 304*a-e* may be optional. For instance, the clock 320 may be optional and fewer or more sensors than those illustrated in FIG. 3 may be implemented in accordance with the systems and methods disclosed herein.

As described above in connection with FIG. 1, one or more of the sensors 304*a-e* may sense or detect information regarding the situation, surroundings and/or status of the electronic device 302. The sensors 304*a-e* may be examples of the one or more sensors 104 described in connection with FIG. 1. For example, the image sensor 304*a* may obtain image information 306*a* (e.g., pixel data), which may include one or more images of the surroundings of the electronic device 302. The location sensor 304*b* may obtain location information 306*b* (e.g., coordinates, latitude and longitude, navigation data, etc.). The motion sensor 304*c* may obtain motion information 306*c*. The light sensor 304*d* may obtain ambient light information 306*d*. The audio sensor 304*e* may obtain audio information 306*e*. The sensor information 306*a-e* may be provided to the action selector 310. It should be noted that one of more of the types of information described herein (as described in connection with one or more of FIGS. 1-21, for example) may be optional. More, fewer and/or other types of information may be utilized. In some configurations, one or more of the types of information described herein (e.g., temporal information 322, image information 306*a*, location information 306*b*, motion information 306*c*, ambient light information 306*d* and/or audio information 306*e*, etc.) may be stored in the memory 303.

The action selector 310 may determine one or more actions 312 based on the temporal information 322, image information 306*a*, location information 306*b*, motion information 306*c*, ambient light information 306*d*, audio information 306*e*, action usage history 308, class of an object (e.g., identified object) and/or a user preference setting 324. For example, the action selector 310 may include an object classifier 326. The object classifier 326 may perform object detection on the image information 306*a*. For example, the object detection may detect (e.g., identify) and/or recognize objects such as text, symbols, faces, people, signs, product containers (e.g., boxes, bottles, cartons, etc.), structures (e.g., buildings, roads, bridges), vehicles, bar codes, Quick Response (QR) codes, etc.

The object classifier 326 may classify one or more detected objects. For example, the object classifier 326 may detect text appearing in the image information 306*a*. For instance, the object classifier 326 may classify text may be classified as a phone number, email address, street address, product name, product brand, Internet address (e.g., web link), street sign, business sign, book text, name, title, International Standard Book Number (ISBN) and/or media information (e.g., movie title, song title, artist name, television program name, etc.), etc. For example, the image sensor 304*a* may capture image information 306*a* of a business card that includes a name, a company name, a telephone number and an email address. In some configurations, the object classifier 326 may perform optical character recognition (OCR) on the image information 306*a* to determine whether the image information 306*a* includes text. The object classifier 326 may search the recognized text for formatting that would indicate a particular class of information. For example, the object classifier 326 may recognize "JohnDoe@SomeCompany.com" as an email address by parsing the string and recognizing the "@" symbol and the sub-string ".com" at the end. In another example, the object classifier 326 may recognize "555-555-0124" as a phone number because it meets the criteria of two 3-digit numbers and a 4-digit number separated by hyphens. Text objects may additionally or alternatively be classified according to language (e.g., English, Spanish, German, Japanese, Chinese, Russian, etc.). The object classifier 326 may also detect one or more symbols appearing in the image information 306a.

The object classifier 326 may classify a symbol as a product brand, product name, business sign, flag and/or company name, etc. For example, the object classifier 326 may compare the image information 306a (or a subset of the image information 306a) with one or more entries in a database of feature descriptors for known symbols, brands and logos. A matching entry may indicate a corresponding product brand name, product name, business name, company name, organization, sports team, etc.

The object classifier 326 may detect one or more faces appearing in the image information 306a. The object classifier 326 may classify a face may be classified as a celebrity face, a non-celebrity face, by gender and/or by expression (e.g., happy, sad, excited, tired, etc.), etc. For example, the object classifier 326 may compare the image information 306a (or a subset of the image information 306a) with one or more entries in a database of feature descriptors (which may be stored in the memory 303, for example) for known faces (e.g., known contacts' faces, known celebrity faces, etc.). A matching entry may indicate a corresponding celebrity name.

The location sensor 304b may produce location information 306b. In one example, the location sensor 304b includes a GPS receiver that calculates latitude and longitude coordinates of the electronic device 302 based on received GPS satellite signals. In another example, the location sensor 304b may determine the location of the electronic device 302 by measuring wireless network (e.g., cellular, Wi-Fi, etc.) signals and searching a database of wireless network locations. For instance, the electronic device 302 may receive beacon signals from three wireless networks with known locations and determine a location of the electronic device 302 by comparing signal strength measurements that indicate the proximity of the electronic device 302 to the known wireless network locations. The location information 306b may include coordinates and/or geographical locations (e.g., country, state, county, city, town, region, street address, etc.).

In some configurations, the object classifier 326 may classify one or more locations based on the location information 306b. For example, the object classifier 326 may determine additional information corresponding to the location information. For example, the object classifier 326 may utilize coordinates of the location information 306b to determine whether the electronic device 302 is currently at a user's home, work, at a gym, at a shopping center, a grocery store, a restaurant, in a particular country, state, city, county, town, park and/or recreational area (e.g., national park, tourist attraction, wilderness area, beach, ski resort, etc.), etc. In some configurations, the object classifier 326 may send a request (via a communications interface as described in connection with FIG. 1, for example) to a remote device (e.g., server) to determine one or more businesses, recreational areas, etc., that are in the current proximity of the electronic device 302 and/or if the electronic device 302 is nearby or inside of a structure (e.g., business such as a mall, restaurant, grocery store, retail store, etc.). Additionally or alternatively, the object classifier 326 may determine whether the electronic device 302 is traveling along a particular route (e.g., road, highway, interstate, trail, etc.).

The motion sensor 304c (e.g., one or more accelerometers) may provide motion information 306c. The motion information 306c may indicate the motion of the electronic device 302. For example, the motion information 306c may indicate whether the electronic device 302 is stationary or moving and/or a pattern of motion. In some configurations, for example, the object classifier 326 may perform motion recognition on the motion information and/or classify the motion information. For example, the object classifier 326 may determine whether the user of the electronic device 302 is walking, jogging, running, exercising and/or traveling (in a car, train, boat, airplane, etc.), etc. For instance, the object classifier 326 may determine whether the motion information 306c most closely matches an acceleration and/or motion profile corresponding to a particular activity. In particular, as a user jogs, the motion information 306c may indicate that the electronic device 302 is moving within a range of speeds for jogging and/or that the electronic device 302 is bouncing in a pattern characteristic of jogging.

The light sensor 304d may provide ambient light information 306d. The ambient light information 306d may indicate an amount of ambient light being captured by the light sensor 304d. In some configurations, the object classifier 326 may classify the ambient light information 306d. For example, the light sensor 304d may provide light condition information. In some configurations, the object classifier 326 may classify the ambient light information (e.g., light condition information) as an indoor light condition or an outdoor light condition. Accordingly, the context-aware application controller 354 may take indoor and outdoor contexts (e.g., scenarios) into account (when determining one or more actions 312, for example). For instance, recognized address text in an outdoor condition may indicate a greater likelihood that a navigation action may be selected. Accordingly, the action selector 310 may suggest a navigation action and/or application for addresses in outdoor scenarios, since these may be ranked higher when the ambient light information 306d indicates an outdoor light condition.

The audio sensor 304e (e.g., one or more microphones) may provide audio information 306e. In some configurations, the object classifier 326 may perform audio recognition on the audio information 306e and/or classify the audio information 306e. For example, the audio recognition may detect (e.g., identify, recognize, etc.) information such as speech, speaker identity (e.g., electronic device 302 user, celebrity, non-celebrity, etc.), speaker gender, expression (e.g., happy, sad, excited, tired, etc.), music, media soundtrack, product jingles, sound effects, spoken information (e.g., phone number, email address, street address, product name, product brand, Internet address (e.g., web link), name, title and/or media information (e.g., movie title, song title, artist name, television program name, etc.)), etc. Audio information 306e may additionally or alternatively be classified according to language (e.g., English, Spanish, German, Japanese, Chinese, Russian, etc.).

The action selector 310 may determine the one or more actions 312 based on the sensor information 306a-e (e.g., the class(es) of one or more objects indicated by the sensor information 306a-e). The action selector 310 may be an example of the action selector 110 described in connection with FIG. 1. The action selector 310 may map the sensor information 306a-e to one or more actions 312. In some configurations, the action selector 310 may include and/or maintain mapping information (e.g., a mapping table) that indicates a correspondence between the sensor information 306a-e (e.g., the class(es) of one or more objects indicated by the sensor information 306a-e) and one or more actions. Each of the actions may correspond to one or more applications (e.g., programs). In some configurations, the mapping may be indicated in an application database 328. The application database 328 may include, for example, one or more sensor information 306a-e classes, one or more corresponding actions and/or one or more corresponding applications.

In some configurations, the action selector 310 may determine the one or more actions 312 based on action usage history 308. The action usage history 308 may include a record of actions selected, actions performed and/or contextual information. The contextual information may be based on and/or include one or more of the classes of sensor information 306 and temporal information 322. For instance, the action usage history 308 may include statistics (e.g., counts of) of selected actions in connection with the contextual information. The action usage history 308 may be an example of the action usage history 108 described in connection with FIG. 1. In some configurations, the action usage history 308 may be expressed as a number of times that an action has been performed, a number of times a class of an object has been used to perform an action, and/or a number of times an action has been selected or used (based on a received user input and/or otherwise). One or more of these counts may be associated with contextual information, such as when a particular object is detected, when at a particular location, at a particular time, when moving in a particular way, etc.

It should be noted that if an action usage history 308 does not contain any existing (e.g., previous) data for a particular action and/or context, the action selector 310 may determine and/or utilize one or more default actions 312. The default action(s) 312 may be based on the temporal information 322 and/or the sensor information 306a-e class. For example, if the image information 306a indicates a phone number, a default phone calling action and a default phone contact adding action may be utilized. In some configurations, one or more default actions may be stored in the memory 303.

In some configurations, the action selector 310 may rank actions. For example, the action ranks may be expressed as a ranking table 332. The ranking table 332 may indicate a ranking of one or more actions and/or applications. In some configurations, the ranking table 332 may be integrated with the application database 328. For example, the application database 328 may include the ranking corresponding to each action and/or application (based on the contextual information and/or action usage history, for example). In other configurations, the ranking table 332 may be separate from the application database 328. The action selector may access the application database 328 and/or the ranking table 332 in the memory 303.

In some configurations, the action selector 310 may rank the one or more actions and/or applications based on the class of an object (e.g., identified object). For example, actions and/or applications that are more relevant to a class of an object may be ranked higher. For an identified phone number, for instance, a phone call action with a dialer application and an add to contacts action with a contacts application may be ranked above less relevant actions and/or applications, such as a search action (with a browser application) and/or a note taking action (with a note application). For a URL, for example, a search action (with a browser application) may be ranked above a note taking action (with a note application). For an address, for instance, a navigation action (with a map application) may be ranked above a note taking action (with a note application).

In some configurations, the action selector 310 may rank the one or more actions and/or applications based additionally or alternatively on the action usage history. For example, actions and/or applications that have been selected and/or performed more times may be ranked higher. For instance, if an add to contacts action (with a contacts application) has been selected and/or performed more times than a phone call action (with a dialer application), the add to contacts action may be ranked above the phone call action (for identified phone numbers, for example).

In some configurations, the action selector 310 may rank the one or more actions and/or applications by associating weights with the action(s) and/or application(s). For example, a higher weight may be associated with actions and/or applications that have been selected and/or performed more times than other actions and/or applications. Additionally or alternatively, a higher weight may be associated with actions and/or applications where a particular class of an object has been used to perform the action. For example, if a phone number class has been used many times to perform a phone call action, the phone call action may be weighted higher for contexts when a phone number is identified. Accordingly, ranking the one or more actions may be accomplished by associating weights based on a number of times an action is performed (according to the action usage history 308) and/or a number of times that the class of an object is used to perform the action.

In some configurations, the ranking indicated in the ranking table 332 may be based on a counter. For example, each time an action is selected and/or performed in a particular context, the action selector 310 may increment (e.g., add a value to) the counter of the corresponding action for that context. When the context occurs again (as indicated by the temporal information 322 and/or one or more of the sensor information 306a-e), action(s) 312 may be ranked in accordance with the count. For example, if calling a phone number is performed more than adding the phone number to contact information in a particular context, the action selector 310 may rank the phone call action above the phone number adding action in the ranking table 332. In some configurations, the phone call action may accordingly be communicated to a user more prominently (e.g., at the top of a list, in bold text, in underlined text and/or highlighted in a color, etc.) than the phone number adding action.

In some configurations, the ranking indicated in the ranking table 332 may be based on an action selection probability. The action selection probability may be calculated by the action selection probability calculator 330. For example, the action selection probability calculator 330 may rank actions in accordance with a probability that the actions will be selected for a context. For instance, the action selector 310 may calculate action selection probabilities corresponding to one or more actions. Each action selection probability may be calculated based on one or more of the sensor information 306a-e (e.g., sensor information 306a-e class(es)) and the action usage history 308.

For example, the action selection probability may be the sum of a sensor input factor (optionally multiplied by a sensor input weighting factor) and an action usage history factor (optionally multiplied by an action usage history weighting factor). The sensor input factor may indicate how closely one or more of the sensor information 306a-e matches a particular context. For example, the sensor input factor may range from not matching a particular context at all (e.g., none of the contextual information 322, 306a-e matches a context in which an action was selected) to closely matching the context (e.g., all of the contextual information 322, 306a-e closely matches a context in which an action was selected). For example, if the temporal information 322 is within a threshold time range (e.g., within 30 minutes), the image information 306a indicates a same object class, the location information 306b indicates a location within a threshold distance (e.g., 300 feet), the motion information 306c indicates the same activity, the ambient light information 306d indicates a brightness within a threshold range and the audio information 306e indicates the same context, then the sensor input factor may be at a maximum value.

The action usage history factor may indicate a proportion of action selection and/or performance in a particular context. Accordingly, the action usage history factor may range from a minimum value where an action has never been selected and/or performed in a context to a maximum value where only one action has always been selected and/or performed in a context. For example, if one action has always been selected in a particular context, then the action usage history factor may be at a maximum value for that action in that context. For instance, if a map application has always been selected when the electronic device 302 (e.g., an automobile) is driving along a certain route, then the action usage history factor may be at a maximum value for that context. However, if multiple different actions have been selected in particular context and/or an action has not always been selected in the context, then the action usage history factor may be less than the maximum value. The action usage history factor may represent a proportion of instances of a context when that action has been taken. For example, if a first action has been selected 70% of the time in a context, a second action has been selected 20% of the time in the context and no action has been selected 10% of time in the context, then the usage history factor for the first action may be 70% of the maximum value and the action usage history factor may be 20% for the second action.

The weighting factors may assign a relative weight to each of the sensor input factor and the action usage history factor. In some configurations, the weighting factors may sum to 1. For example, the sensor input weighting factor may be given a value of 0.6 and the action usage history weighting factor may be given a value of 0.4 to give greater weight to the sensor input factor in the ranking score.

In some configurations, the action selector 310 may optionally calculate the action selection probability additionally based on a user preference factor (optionally multiplied by a user preference weighting factor). For example, the action selection probability calculator 330 may calculate the action selection probability as the sum of the sensor input factor (optionally multiplied by the sensor input weighting factor), the action usage history factor (optionally multiplied by the action usage history weighting factor) and the user preference factor (optionally multiplied by the user preference weighting factor).

As described above, the electronic device 302 may receive an indication of a user preference for some particular action (in a context, for example). For instance, the electronic device 302 may receive an indication (via a touchscreen, keyboard, microphone, etc.) that a user may prefer to select an action corresponding to a particular time, detected object, location, motion, ambient light and/or audio. The user preference(s) may be stored (in the memory 303, for example) as part of the user preference setting 324. For example, the user preference setting 324 may include one or more user preference indicators and/or one or more user preference factors. A user preference factor may range from a minimum to maximum value based on an indicated user preference. For example, the user preference factor may range from no preference at a minimum to a heavy preference at a maximum. The user preference weighting factor may be given a default value and/or may be configured (e.g., adjusted) based on user input. In some configurations, the action selection probability may be calculated in accordance with Equation (1).

$$P(A) = W_1 U + W_2 S + W_3 H \quad (1)$$

In Equation (1), P(A) is the action selection probability for a context, $W_1$ is a user preference weighting factor, U is a user preference factor, $W_2$ is a sensor input weighting factor, S is a sensor input factor, $W_3$ is an action usage history weighting factor and H is an action usage history factor. It should be noted that fewer and/or different factors may be utilized in some configurations. The processor 301 (e.g., action selector 310) may access the user preference setting 324b in the memory 303.

The action selector 310 may provide one or more of the actions corresponding to (e.g., mapped to) the sensor information 306 (e.g., sensor information 306 class(es)) as the one or more actions 312. In some configurations, one or more of the action(s) 312 may be communicated (e.g., presented on the display 305, indicated with audio (e.g., read as speech, with an audio chime, etc.) to a user. For example, the electronic device 302 may present an indicator of one or more of the actions 312 as a button, icon and/or text on a touch screen display 305. In some configurations, one or more of the actions 312 may be communicated to the user in accordance with the ranking table 332. For example, a highest ranked action 312 may be communicated more prominently (e.g., first on a list, highlighted in a color, displayed in bold text, etc.) than one or more of the other actions 312. Additionally or alternatively, only a limited number (e.g., up to three) of actions 312 may be communicated. For example, only the actions 312 with the three highest ranking scores in the ranking table 332 may be communicated. In some configurations, the number of communicated actions 312 may be configurable. Additionally or alternatively, the number of communicated actions 312 may be based on an amount of display space available and/or an amount of time. For example, if a touch screen display 305 is currently presenting 5 detected objects for which actions are available, only one action 312 may be provided for each of the detected objects. However, if the touch screen display 305 is only displaying one detected object, then five actions 312 may be displayed corresponding to that object.

The one or more actions 312 may be provided to the action performer 316. The action performer 316 may perform at least one of the one or more actions 312 (e.g., the selected actions 318) based on at least one application 336. For example, the action performer 316 may perform the action(s) 318 (e.g., one or more selected actions 318). For example, the electronic device 302 may perform an action 318 by opening (or switching to) an application 336 that performs the selected action 318 and/or by performing the selected action 318 with the application.

In some configurations, the action performer 316 may determine one or more selected actions 318 automatically (e.g., without user input). For example, the action performer 316 may select one or more of the highest ranked actions 312 as selected actions 318. Accordingly, the action performer 316 may perform the one or more selected actions 318 automatically (e.g., without user input). For example, the action performer 316 may automatically provide and/or perform one or more of the selected actions 318. For instance, the action performer 316 may automatically launch an application. In one specific example, the action performer 316 may automatically launch a dialer application and/or a contacts application if there is a business card associated with an identified object (e.g., phone number, e-mail address, etc.).

In some configurations, the action performer 316 may select one or more actions based on a received input (e.g., an optional user input 314). For example, the electronic device 302 may detect and/or receive a user input (e.g., a tap and/or swipe on a touch screen, a mouse click event, a speech recognition input, a motion input, a tilt input, etc.) that indicates a particular action. For instance, the electronic device 302 may detect that a user has tapped some text or an icon that indicates a particular action. The action indicated by the user input 314 may be one or more of the actions 312 or other action(s). The action performer 316 may indicate the selected action 318 to the action selector 310 and/or to one or more applications 336.

In some configurations, the context-aware application controller 354 may communicate one or more of the actions 312 based on a received input (e.g., user input 314). For example, the action selector 310 may detect one or more objects indicated by the image information 306a. The context-aware application controller 354 may communicate one or more of the detected objects (via a communication interface as described in connection with FIG. 1, for instance). For example, the context-aware application controller 354 may emphasize (e.g., highlight, underline, circle, etc.) one or more of the detected objects on a display 305, may output an audio signal (e.g., speech, a tone, etc.) indicating one or more of the detected objects and/or may output a tactile signal (e.g., a vibration) for one or more of the detected objects. If a user input 314 is received that indicates one or more of the detected objects, the context-aware application controller 354 may display one or more of the actions 312 corresponding to the detected object. Then, the action performer 316 may perform one or more of the actions (e.g., selected actions 318) indicated by the user input 314.

In some configurations, whether to perform an action automatically or based on user input may be configurable. For example, user preference settings 324 may indicate that the action performer 316 should take pictures automatically whenever a particular recognized person is detected, should start recording audio whenever speech audio is recognized and should wait for a user input 314 to dial a recognized phone number.

As mentioned above, the action selector 310 may update the action usage history 308 based on the selected action 318. For example, the action selector 310 may record the selected action 318 (e.g., update a count and/or action selection probability corresponding to the selected action 318) with the corresponding contextual information (e.g., sensor information 306, information based on the sensor information 306 (e.g., one or more object classes, detected/recognized objects, recognized speech, etc.)) and/or temporal information. In some cases, the action usage history 308 may not include an existing (e.g., previous) record of the selected action 318. In these cases, the action usage history 308 may create a new action in the action usage history 308 to reflect the new selected action 318. In this way, the action selector 310 may flexibly update the action usage history 308 to more closely reflect electronic device 302 behavior (and/or a user's usage of the electronic device 302). Accordingly, the action(s) 312 may be more relevant to a user (particularly as more action usage history 308 is collected, for example).

In some configurations, the action selector 310 may provide data 334 to the one or more applications 336. For example, the action selector 310 may provide data 334 based on the selected action 318. For example, if the selected action 318 is to call a phone number, the action selector 310 may provide the phone number detected from the image information 306a to the application 336. In this way, one or more user interaction steps may be avoided. For instance, the user may not have to indicate an action or may only indicate the phone call action, rather than having to copy/paste and/or import the phone number into a dialer application.

A group of specific examples that may be implemented in accordance with the systems and methods disclosed herein are given as follows. It should be noted that one or more of these examples may be implemented and/or performed separately or in combination. It should also be noted that each of the examples may be performed automatically (e.g., without user input) or based on user input. As described above, determining one or more actions may be based on the class of an object (e.g., detected object). Performing at least one of the one or more actions may include running a dialer application, running a text message application and/or running a contacts application when the class of the object is a phone number. Performing at least one of the one or more actions may include running a browser application when the class of the object is a Uniform Resource Locator (URL). Performing at least one of the one or more actions may include running a map application when the class of the object is an address. Performing at least one of the one or more actions may include running an e-mail application when the class of the object is an e-mail address. Performing at least one of the one or more actions may include running a note application when the class of the object is generic text. Performing at least one of the one or more actions may include running a document writer application when the class of the object is a whiteboard object. Performing at least one of the one or more actions may include running a search application when the class of the object is a grocery item. Performing at least one of the one or more actions may include running a banking application when the class of the object is banking information (e.g., an account number, Magnetic Ink Character Recognition (MICR) number, a credit card number, debit card number, etc.). Performing at least one of the one or more actions may include running a payment application (e.g., near-field communication (NFC) payment application, payment management application, etc.) when the class of the object is payment information (e.g., an account number, Magnetic Ink Character Recognition (MICR) number, a credit card number, debit card number, etc.). Performing at least one of the one or more actions may include running a contacts application, a dialer application, a text messaging application and/or a search application when the class of the object is a face. Performing at least one of the one or more actions may include running a search application, a contacts application, a dialer application, a text messaging application and/or a browser when the class of the object is a barcode.

Figure 4:
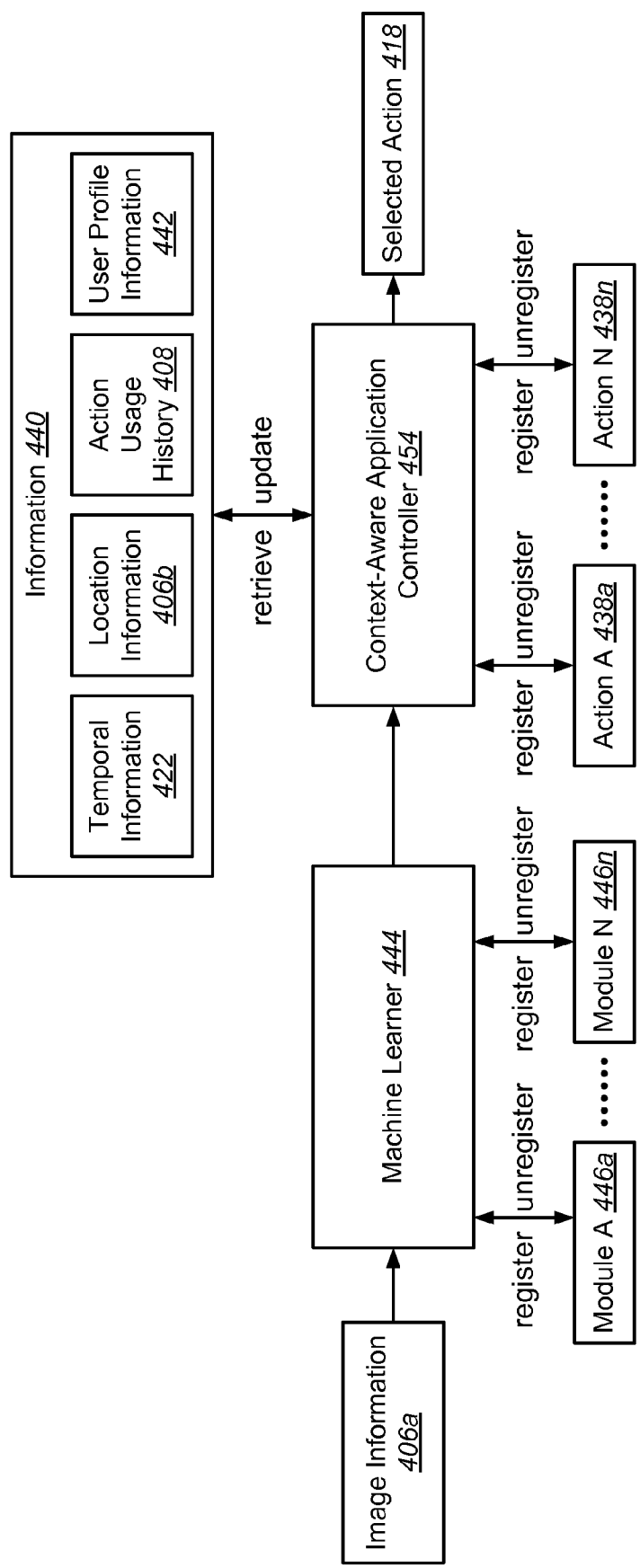
FIG. 4 is a block diagram illustrating an example of a more specific configuration of context-aware application control in accordance with the systems and methods disclosed herein.

FIG. 4 is a block diagram illustrating an example of a more specific configuration of context-aware application control in accordance with the systems and methods disclosed herein. The configuration described in connection with FIG. 4 may be implemented in one or more of the electronic devices 102, 302 described in connection with one or more of FIGS. 1 and 3. It should also be noted that one or more of the elements and/or modules described in connection with FIG. 4 may be examples of and/or may be implemented in addition to or alternatively from one or more of the elements and/or modules described in connection with FIGS. 1 and 3. FIG. 4 illustrates a machine learner 444, a context-aware application controller 454, modules A-N 446*a-n* and actions A-N 438*a-n*.

The machine learner 444 may receive image information 406*a*. The image information 406*a* may be an example of one or more of the sensor information 106 and the image information 306*a* described in connection with one or more of FIGS. 1 and 3. For example, the image information 406*a* may include one or more input frames from an image sensor. In some configurations, the machine learner 444 may perform one or more of the functions described in connection with the object classifier 326. It should be noted that the context-aware application controller 454 may additionally or alternatively perform one or more of the functions described in connection with the object classifier 326 in some configurations. As illustrated in FIG. 4, the machine learner 444 may be separate from the context-aware application controller 454 in some configurations. In other configurations, the machine learner 444 may be included in the context-aware application controller 454.

The machine learner 444 may provide one or more machine learning capabilities. For example, the machine learner 444 may include optical character recognition (OCR), which may be used to recognize text from an image and/or video. Another example of machine learning capabilities is a deep convolution neural network, which may be used to recognize a variety of objects, scenes, and/or events, among other things. Yet another example of machine learning capabilities is face detection and/or recognition. The machine learner 444 may provide machine learning information to the context-aware application controller 454. For example, the machine learner 444 may indicate recognized text information, scenes, events, one or more detected faces, one or more recognized faces and/or one or more other objects.

The machine learner 444 may register and/or unregister one or more modules A-N 446*a-n*. The one or more modules A-N 446*a-n* may provide one or more machine learning capabilities for the machine learner 444. In some configurations, the machine learner 444 may register or unregister one or more modules A-N 446*a-n*. In one example, module A 446*a* may be an OCR module that provides text recognition capability. Once module A 446*a* is registered, the machine learner 444 may recognize text. Additionally or alternatively, a face detection and recognition module 446 may be registered by the machine learner 444 to provide face detection and recognition capability.

Registering and/or unregistering the module(s) 446*a-n* may be performed automatically and/or may be based on user input. For example, the machine learner 444 may automatically register one or more modules 446 when they become available. In some configurations, one or more modules 446 may become available via a software and/or firmware update. In some configurations, the machine learner 444 may automatically unregister one or more modules 446 (if they are not used for a threshold period of time, for example). Additionally or alternatively, the machine learner 444 (and/or another module) may provide an interface to allow registering or unregistering of one or more modules 446. The interface may detect and/or receive a user input indicating a directive to register or unregister one or more modules 446*a-n*. If one or more modules 446 are unregistered, their corresponding capabilities may be removed (from the machine learner 444, for example).

The context-aware application controller 454 may select one or more of the actions A-N 438*a-n*. For example, the context-aware application controller 454 may provide one of the actions A-N 438*a-n* as a selected action 418 and/or may indicate a selected action 418 with a decision indicator. The context-aware application controller 454 may be one example of one or more of the context-aware application controllers 154, 354 described in connection with one or more of FIGS. 1 and 3.

The context-aware application controller 454 may register one or more actions A-N 438*a-n* and/or corresponding applications that perform the actions A-N 438*a-n*. Registering the action(s) 438*a-n* may be performed automatically and/or may be based on user input. For example, when a user input is received indicating selection of an action that has not been registered, the context-aware application controller 454 may register the action 438. For instance, the context-aware application controller 454 may add an action 438 (e.g., action indicator) and/or an application (e.g., application indicator) to a group of registered actions and/or applications (in an application database and/or table, for instance). In some configurations, one or more actions 438 and/or applications may be registered by default. For example, one or more actions 438 and/or applications may be registered by default according to the capabilities of the machine learner 444 (e.g., according to the one or more modules 446*a-n* registered to the machine learner 444). For instance, if the machine learner 444 provides text recognition, one registered action 438 may be phone number handling (with associated applications such as dialer and messaging applications, for example). Additionally or alternatively, the context-aware application controller 454 may automatically register one or more actions 438 when they become available (e.g., via a software and/or firmware update). In some configurations, the context-aware application controller 454 (and/or another module) may provide an interface to allow registering one or more actions 438. The interface may detect and/or receive a user input indicating a directive to register one or more actions 438*a-n*. The context-aware application controller 454 may register one or more actions 438*a-n* in response to the directive. One or more of the actions 438*a-n* (e.g., newly registered actions) may correspond to and/or may be applied for results (e.g., OCR, object detection and/or object recognition) provided by the machine learner 444.

In some configurations, the context-aware application controller 454 may unregister one or more actions A-N 438*a-n* and/or corresponding applications that perform the actions A-N 438*a-n* (e.g., remove them from an application database and/or table, for instance). Unregistering the action(s) 438*a-n* may be performed automatically and/or may be based on user input. For example, if a registered action 438 and/or application has not been selected and/or used for a threshold amount of time or has been selected and/or used less than a threshold proportion of the time (relative to other actions and/or applications, for instance), then the context-aware application controller 454 may unregister the action (and/or application). Additionally or alternatively, if a calculated action selection probability for that action (and/or application) is less than a threshold probability, the context-aware application controller 454 may unregister the action (and/or application). The action (and/or application) may be unregistered automatically and/or upon receiving a user input approval or confirmation.

In some configurations, the context-aware application controller 454 (and/or another module) may provide an interface to allow unregistering one or more actions 438 (and/or corresponding applications). The interface may detect and/or receive a user input indicating a directive to unregister one or more actions 438*a-n*. The context-aware application controller 454 may unregister one or more actions 438*a-n* in response to the directive. If one or more actions 438 are unregistered, their corresponding capabilities may be removed (from the context-aware application controller 454, for example).

In some configurations, the context-aware application controller 454 may retrieve and/or update information 440. For example, the context-aware application controller 454 may retrieve and/or update temporal information 422, location information 406*b* (e.g., GPS information), action usage history 408 (e.g., action selection counts, action performance counts, user habit information, etc.) and/or user profile information 442.

It should be noted that the temporal information 422 may be an example of the temporal information (e.g., temporal information 322) described above in connection with one or more of FIGS. 1 and 3. The location information 406*b* may be one example of the location information (e.g., location information 306*b*) described above in connection with one or more of FIGS. 1 and 3. The action usage history 408 may be one example of the action usage history 108, 308 described above in connection with one or more of FIGS. 1 and 3.

The user profile information 442 may be information about a user of an electronic device. For example, user profile information 442 may include user identification (e.g., name, handle, etc.), a user preference setting (e.g., a user customized rule) and/or one or more other user attributes (e.g., gender, age, nationality, etc.). As described above, a user preference setting may be utilized in ranking and/or calculating an action selection probability for one or more of the actions 438 (and/or applications).

Figure 5:
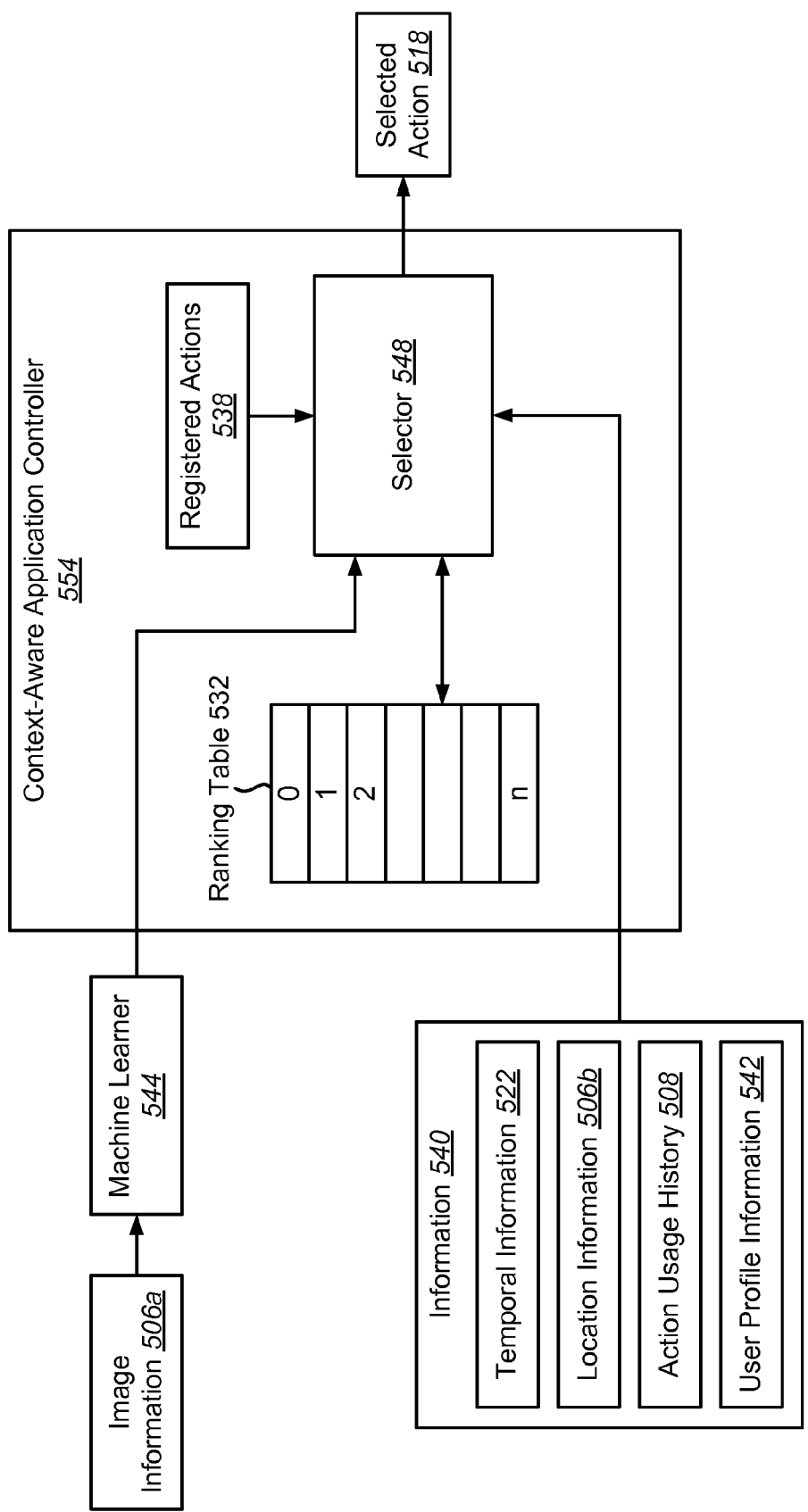
FIG. 5 is a block diagram illustrating a more specific configuration of a context-aware application controller.

FIG. 5 is a block diagram illustrating a more specific configuration of a context-aware application controller 554. The context-aware application controller 554 may be one example of one or more of the context-aware application controllers 154, 354, 454 described in connection with one or more of FIGS. 1 and 3-4.

As described above in connection with FIG. 4, a machine learner 544 may receive image information 506*a* (e.g., one or more image frames). The machine learner 544 output may be provided to the context-aware application controller 554 (e.g., to a selector 548 included in the context-aware application controller 554). As described above in connection with FIG. 4, information 540 may also be provided to the context-aware application controller 554 (e.g., to the selector 548). In some configurations, the information 540 may include temporal information 522, location information 506*b*, action usage history 508 and/or user profile information 542.

The context-aware application controller 554 may generate and/or maintain a ranking table 532 in some configurations. The ranking table 532 may be one example of the ranking table 332 described in connection with FIG. 3. The selector 548 may retrieve one or more rankings from the ranking table 532 and/or may update the ranking table 532.

One or more registered actions 538 may also be provided to the selector 548. The registered actions 538 may be one example of the application database 328 described in connection with FIG. 3 and/or of the one or more actions A-N 438*a-n* described in connection with FIG. 4.

In some configurations, the selector 548 may determine one or more selected actions 518 as described above in connection with one or more of FIGS. 1-4. For example, the selector 548 may determine an action ranking and/or select an action as described in connection with FIG. 3. In some configurations, the selector 548 may utilize the count mechanism described above and/or may calculate an action selection probability as described in connection with FIG. 3 (e.g., Equation (1)).

Figure 6:
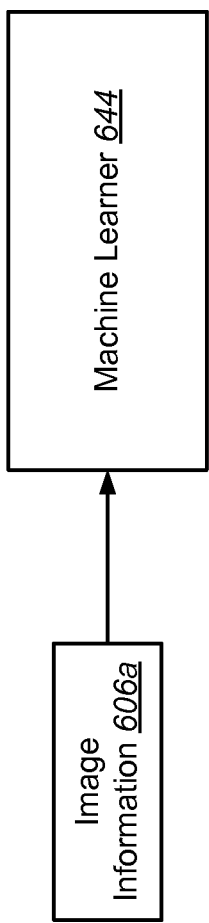
FIG. 6 is a block diagram illustrating an example of image information and a machine learner.

FIG. 6 is a block diagram illustrating an example of image information 606*a* and a machine learner 644. The image information 606*a* and/or the machine learner 644 may be respective examples of the image information (e.g., image information 306*a*, 406*a*, 506*a*) and/or the machine learners 444, 544 described above.

In some configurations, the image information 606*a* (e.g., one or more image frames) may be provided in a still image format (e.g., PNG, JPG, etc.). Additionally or alternatively, the image information 606*a* may be provided in an uncompressed video frame format (e.g., yuv, etc.).

For example, the image information 606*a* may be provided as a still image captured by an image sensor (and/or as processed by an electronic device). In another example, the image information 606*a* may be one or more frames of image information obtained by an image sensor, where the electronic device (e.g., image sensor and/or optical system) are in a preview mode. In the preview mode, for instance, multiple frames of image information 606*a* may be obtained and/or displayed. In some configurations, the image information 606*a* and the machine learner 644 may be an example of a first interface to a context-aware application controller (e.g., context-aware application controller 554).

Figure 7:
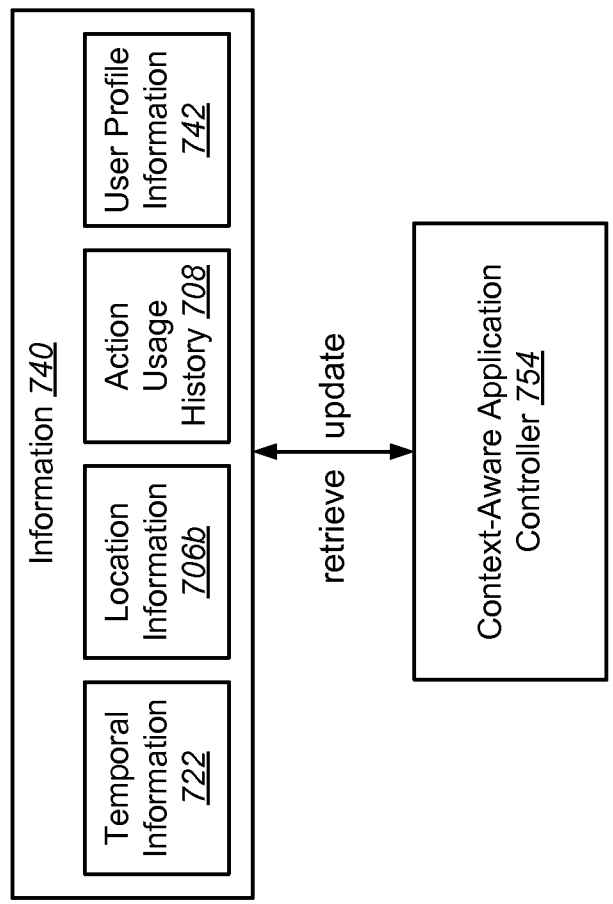
FIG. 7 is a block diagram illustrating another more specific example of a context-aware application controller.

FIG. 7 is a block diagram illustrating another more specific example of a context-aware application controller 754. The context-aware application controller 754 may be one example of one or more of the context-aware application controllers 154, 354, 454, 554 described in connection with one or more of FIGS. 1 and 3-5. As described above in connection with FIGS. 4 and 5, information 740 may be provided to the context-aware application controller 754. In some configurations, the information 740 may include temporal information 722, location information 706*b*, action usage history 708 and/or user profile information 742.

The temporal information 722, location information 706*b* and/or action usage history 708 may be utilized as described above. Examples of temporal information 722 include time of day, day of the week, date, month, year, etc. An example of the location information 706*b* (e.g., GPS, etc.) may include coordinates and/or other geographical information (e.g., country, state, county, city, etc.). In some configurations, the location information 706*b* may indicate a time zone. The action usage history 708 may include, for example, habit information such as a common rule based on a search result or application popularity. For instance, the action usage history 708 may indicate the popularity of one or more actions (e.g., applications) based on how many times an action has been performed and/or selected (automatically or based on a received input, for instance). For example, the action usage history 708 may indicate how frequently and/or how many times a particular action (e.g., application) has been performed (and/or how many times an object has been used to perform an action, for example). Additionally or alternatively, the action usage history 708 may indicate one or more actions (e.g., applications) that a user has searched for.

The user profile information 742 may be information about a user of an electronic device. For example, user profile information 742 may include user identification (e.g., name, handle, etc.), a user preference setting (e.g., a user customized rule) and/or one or more other user attributes (e.g., gender, age, nationality, etc.). The user profile information 742 may be used by the context-aware application controller 754 in some configurations. For example, users that belong to a group (e.g., users within an age range of a particular gender and/or of a nationality (or a group of nationalities)) may tend to use face beautification apps. Accordingly, if the context-aware application controller 754 (and/or the machine learner 644, for example) detects that a user taking a selfie falls into that group or category, an action may be taken to launch a face beautification app to embellish the selfie picture, for example. The popularity of beatifications apps may increase in popularity all over the world in time. As described above, a user preference setting may be utilized in ranking and/or calculating an action selection probability for one or more of the actions (and/or applications). The information 740 may be one example of a second interface to the context-aware application controller 754.

Figure 8:
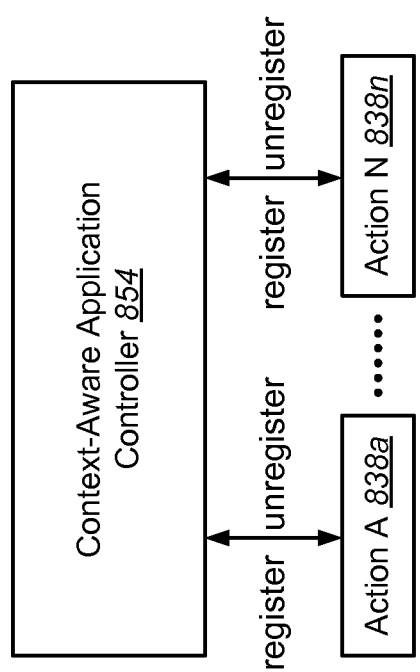
FIG. 8 is a block diagram illustrated another more specific example of a context-aware application controller.

FIG. 8 is a block diagram illustrated another more specific example of a context-aware application controller 854. The context-aware application controller 854 may be one example of one or more of the context-aware application controllers 154, 354, 454, 554, 754 described in connection with one or more of FIGS. 1, 3-5 and 7.

The context-aware application controller 854 may register and/or unregister one or more actions A-N 838*a-n* and/or corresponding applications that perform the actions A-N 838*a-n*. This may be accomplished as described above in connection with FIG. 4. Registering an action 838 (e.g., application) may include recording one or more attributes of the action 838. For example, the context-aware application controller 854 may record (in an application database 328, for instance) an action type, an action identifier, an action description, action permissions, a supported decision type (e.g., dialer, contact, browser, navigation, etc.) and/or supported extra information type (e.g., a bundle of any additional information). Unregistering an action 838 may include deleting one or more of the action 838 attributes (from the application database 328, for example). Unregistering may be performed as described above in connection with FIG. 4. In some configurations, the context-aware application controller 854 may use action attributes to determine one or more applications to use (e.g., suggest, launch, etc.). For example, if the action type is a phone number handling of OCR results, then a number of applications such as a dialer, short message service (SMS), contacts, etc., may be included in decision types for the context-aware application controller 854. The context-aware application controller 854 may then make a decision for action in as described in connection with FIG. 5. The actions A-N 838*a-n* may be one example of a third interface to the context-aware application controller 854.

Figure 9:
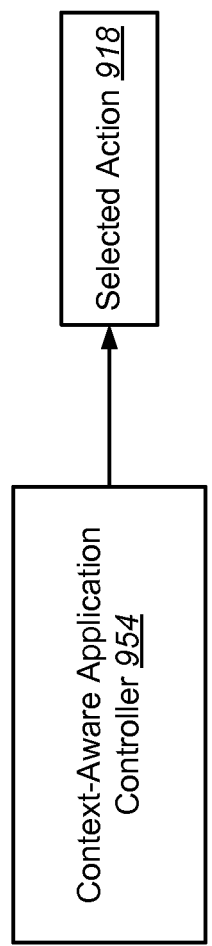
FIG. 9 is a block diagram illustrated another more specific example of a context-aware application controller.

FIG. 9 is a block diagram illustrated another more specific example of a context-aware application controller 954. The context-aware application controller 954 may be one example of one or more of the context-aware application controllers 154, 354, 454, 554, 754, 854 described in connection with one or more of FIGS. 1, 3-5 and 7-8.

As described above, the context-aware application controller 954 may select an action automatically and/or based on user input. For example, an action list may be sorted by priority (in the ranking table 332, 532, for instance). One or more of the highest ranked actions may be automatically selected and/or may be communicated to a user. For example, indicators of the top three actions may be selected and/or may be displayed on a touch screen. In some configurations, the electronic device may receive a user input indicating one of the actions (e.g., a tap event where one of the indicators is displayed). The action performer may provide a selected action 918 corresponding to the received input. The selected action 918 output may be one example of a fourth interface to the context-aware application controller 954.

Figure 10:
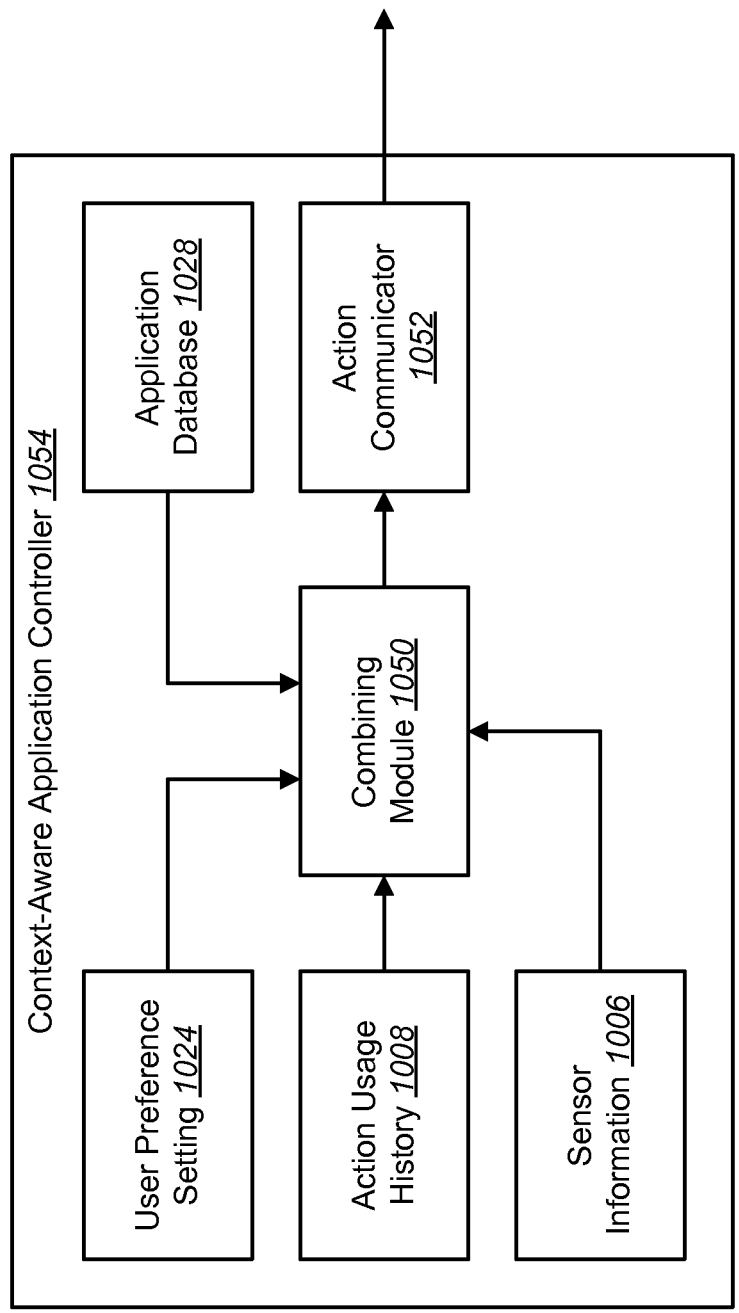
FIG. 10 is a block diagram illustrating another more specific configuration of the context-aware application controller.

FIG. 10 is a block diagram illustrating another more specific configuration of the context-aware application controller 1054. In particular, FIG. 10 illustrates a user preference setting 1024, action usage history 1008, sensor information 1006, a combining module 1050, an application database 1028 and an action communicator 1052. One or more of the elements illustrated and described in connection with FIG. 10 may be optionally implemented in a context-aware application controller 1054.

The user preference setting 1024 may be an example of one or more of the user preference settings described above (e.g., user preference setting 324). For example, the user preference setting 1024 may be established based on received user input. The user preference setting 1024 may establish a priority for one or more actions and/or applications. In this way, a user may give some action or application some "priority" so the context-aware application controller 1054 gives higher preference to the action and/or application. In some configurations, a user preference factor may be determined based on the user preference setting 1024 as described above in connection with FIG. 3. In some configurations, the user preference setting 324, 1024 may also indicate one or more types of detection and/or suggestion (e.g., celebrity face detection/action suggestion, phone number detection/action suggestion, product detection/action suggestion, etc.) that a user prohibits. Accordingly, the electronic device (e.g., context-aware application controller 154, 354, 1054) may not perform those prohibited types of detection and/or may not provide actions for those types of objects and/or contexts. It should be noted that all or part of the user preference setting 1024 information may be optional in some configurations.

The action usage history 1008 may be one example of one or more of the action usage histories 108, 308, 408, 508, 708 described above in connection with one or more of FIGS. 1, 3-5 and 7. The action usage history 1008 may include a statistical action usage history for one or more contexts (e.g., one or more time frames and/or one or more locations). An electronic device (e.g., the context-aware application controller 1054) may build up (e.g., learn) the statistical action usage history over time. Additionally or alternatively, the actions and/or applications that a user has selected may be categorized so the context-aware application controller 1054 may learn the action and/or application category usage statistics within a context (e.g., one or more time frames and/or one or more locations). The categories may indicate a type of action and/or application (e.g., browser application, music application, social media application, phone call action/application, navigation action/application, etc.). In some configurations, an action usage history factor may be determined based on the action usage history 1008 as described above in connection with FIG. 3.

The sensor information 1006 may be an example of one or more of the sensor information 106, 306, 406, 506, 606, 706 described above in connection with one or more of FIGS. 1 and 3-7. For example, the sensor information 1006 may correspond to immediate sensor input that represents an immediate environment and/or usage context. Examples of sensors and/or sensor information 1006 include a camera with object detection and/or scene detection, a GPS receiver with location information, an "always on" motion sensor and ambient light sensor information. In some configurations, the sensor input factor may be determined from the sensor information 1006 as described above in connection with FIG. 3.

The application database 1028 may be an example of one or more of the application databases (e.g., application database 328) described above. As described above, the application database 1028 may include one or more actions and/or applications. In some configurations, the application database 1028 may include one or more user-customized actions and/or applications. For example, an electronic device may receive a user input that indicates customization of one or more actions and/or applications. Customization may include adding (e.g., registering) one or more actions and/or applications to the application database 1028 and/or deleting (e.g., unregistering) one or more actions and/or applications from the application database 1028. Customization may additionally or alternatively include establishing a user preference factor (and/or user preference weighting factor) for a particular action and/or application. This may influence the ranking for the action and/or application. For example, the combining module 1050 may indicate those actions and/or applications a user has previously customized to the action communicator 1052. The action communicator 1052 may communicate (e.g., present, display, cause to appear, etc.) an indication of one or more actions and/or applications for user interaction. (e.g., cause may appear for user interaction. For example, the action(s) and/or application(s) with the highest ranking score(s) will appear for user interaction. In some configurations, the application database 1028 may be predefined. One or more default actions and/or applications may also appear for user interaction (if there is enough space on a display, for example).

The combining module 1050 may be one example of one or more of the action selectors 110, 310 and the selector 548 described above in connection with one or more of FIGS. 1, 3 and 5. The user preference setting 1024, the action usage history 1008, the sensor information 1006 and the application database 1028 may be provided to the combining module 1050.

The combining module 1050 may combine information based on the user preference setting 1024, the action usage history 1008, the sensor information 1006 and/or the application database 1028 in order to determine one or more actions. The collected information may be combined to provide a ranking. In some configurations, the ranking may correspond to a probability of one or more actions and/or applications that may be selected. For example, the combining module 1050 may combine the action usage history factor, the sensor input factor and/or the user preference factor to determine an action selection probability. For instance, this may be accomplished in accordance with Equation (1) ($P(A)=W_1U+W_2S+W_3H$) as described in connection with FIG. 3 above. In some configurations, $W_1 \geq W_2 \geq W_3$ and/or $W_1+W_2+W_3=1$. It should be noted that fewer factors may be utilized in some configurations to calculate the probability (e.g., just the usage history factor and the sensor input factor with weighting). One or more of the actions and/or applications in the application database 1028 may be ranked in accordance with the action selection probability.

The action(s) and/or application(s) with the highest action selection probability or probabilities may be provided to the action communicator 1052 as one or more actions. As described above, the action communicator 1052 may communicate (e.g., display, read out, etc.) one or more of the actions in some configurations. For example, the action communicator 1052 may display a list of actions and/or applications for user interaction.

Figure 11:
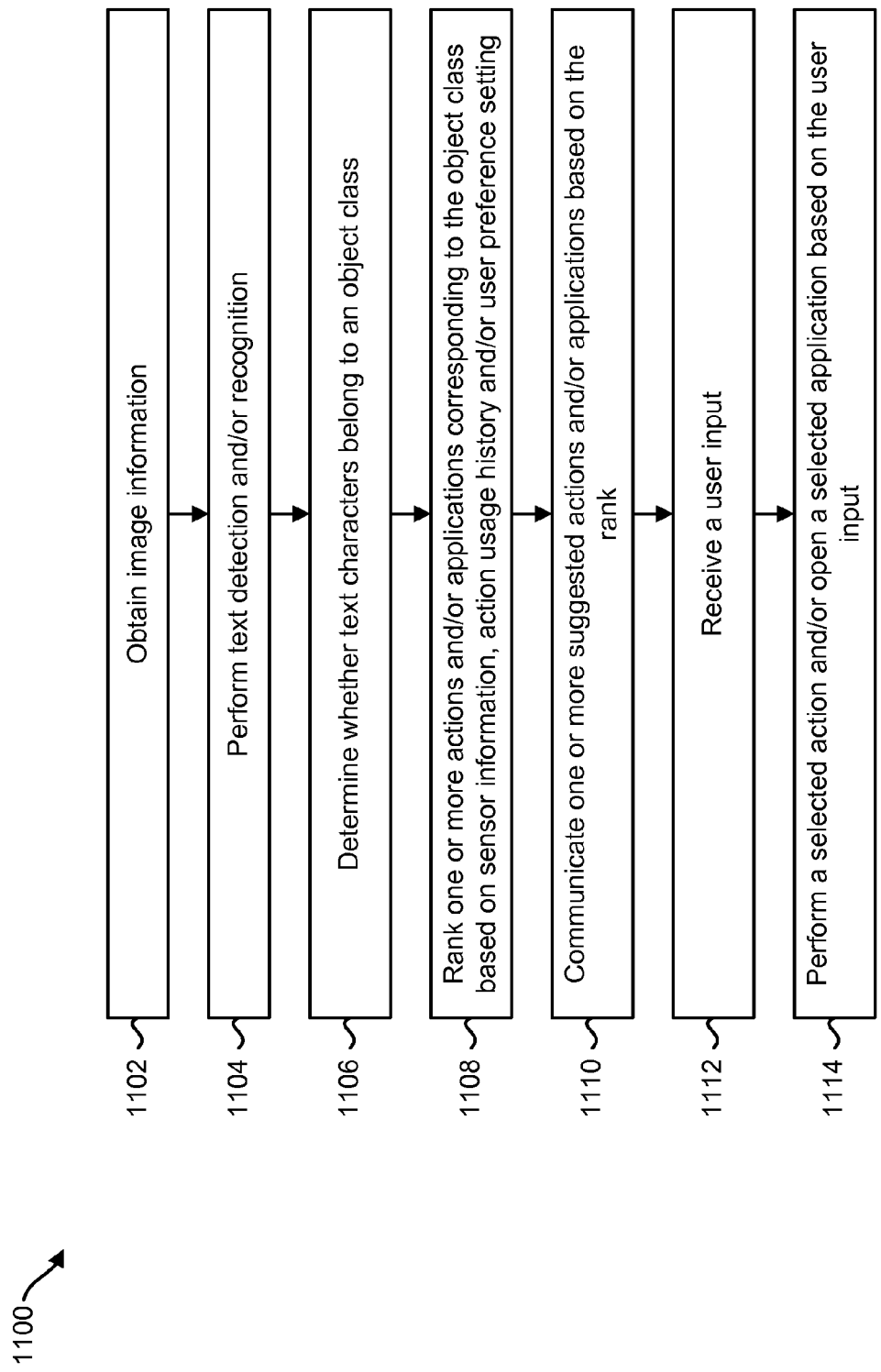
FIG. 11 is a flow diagram illustrating an example of a more specific configuration of a method for context-aware application control.

FIG. 11 is a flow diagram illustrating an example of a more specific configuration of a method 1100 for context-aware application control. One or more of the electronic devices 102, 302 described above may perform the method 1100.

The electronic device 102 may obtain 1102 image information. This may be accomplished as described above in connection with one or more of FIGS. 1 and 3, for example.

The electronic device 102 may perform 1104 text detection and/or recognition based on the image information. This may be accomplished as described above in connection with one or more of FIGS. 1 and 3, for example. For instance, the electronic device 102 may perform optical character recognition (OCR) on the image information to determine text characters in the image information.

The electronic device 102 may determine 1106 whether the text characters belong to an object class (e.g., predefined object class). For example, the electronic device 102 may determine 1106 if the text characters conform to the formatting of a telephone number, email address, street address, etc.

The electronic device 102 may rank 1108 one or more actions and/or applications corresponding to the object class based on sensor information, action usage history and/or user preference setting. This may be accomplished as described above in connection with one or more of FIGS. 1, 3, 5 and 10, for example.

The electronic device 102 may optionally communicate 1110 one or more actions and/or applications based on the rank. This may be accomplished as described in connection with FIG. 3, for example. For instance, the electronic device 102 may display and/or read out a number of the highest ranked action(s) and/or application(s) based on the amount of available screen space and/or proximity to other displayed detected object(s).

The electronic device 102 may optionally receive 1112 a user input. This may be accomplished as described above in connection with one or more of FIGS. 1-3, for example. The user input may indicate one of the actions or may indicate another action.

The electronic device 102 may perform 1114 a selected action and/or open a selected application. This may be accomplished automatically and/or based on a user input. For example, the electronic device 102 may open (e.g., launch, switch to) a selected application or an application corresponding to the selected action. In some configurations, the electronic device 102 may pass data to the application. This may be accomplished as described above in connection with FIG. 3.

Figure 12:
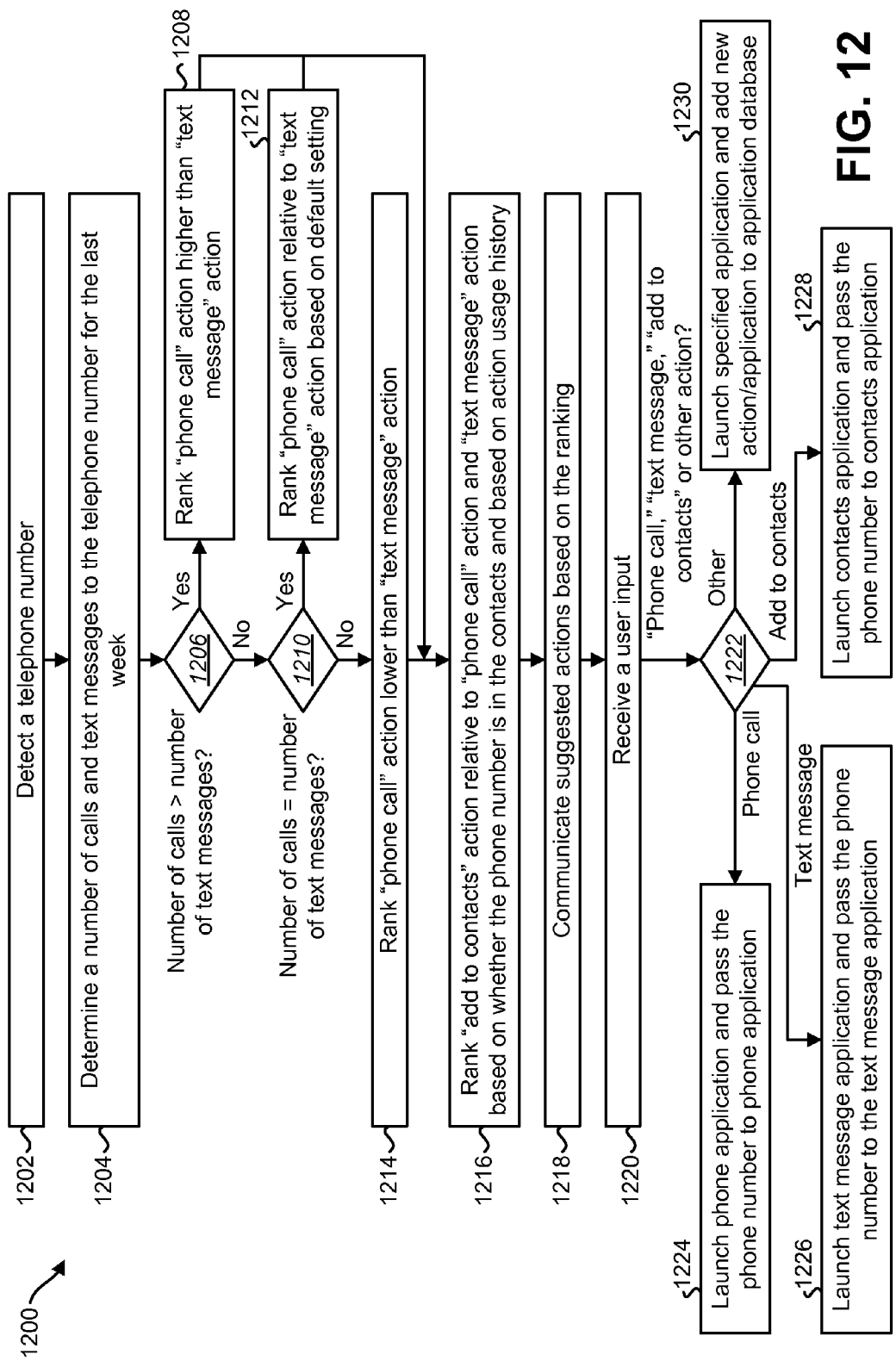
FIG. 12 is a flow diagram illustrating another example of a more specific configuration of a method for context-aware application control.

FIG. 12 is a flow diagram illustrating another example of a more specific configuration of a method 1200 for context-aware application control. The method 1200 may be performed by the electronic device 102 described in connection with FIG. 1, for example.

The electronic device 102 may detect 1202 a telephone number. For example, the electronic device 102 may obtain image information from an image sensor and perform text detection and/or recognition on the image information. The electronic device 102 may further determine that the detected text conforms to a telephone number format.

The electronic device 102 may determine 1204 a number of calls and text messages (e.g., number of text message or number of text message conversations) to the telephone number for the last week. In this example, the number of calls and text messages (or text message conversations) to the telephone number may be a part of action usage history. For instance, each time a particular action (e.g., a phone call is made, a text message is sent, etc.) is taken, the electronic device 102 may record the action usage. It should be noted that a text message conversation may be one or more text messages (e.g., a chain of text messages), where each text message occurs within a threshold period from a previous text message. For example, if 10 text messages are sent and/or received in a row, where each text message is within 10 minutes of the most recent sent or received text message, then all 10 text messages may be part of one text message conversation.

The electronic device 102 may determine 1206 if the number of calls is greater than the number of text messages (e.g., number of text messages or number of text message conversations). If the number of calls is greater than the number of text messages, the electronic device 102 may rank 1208 the "phone call" action higher than the "text message" action.

If the number of calls is not greater than the number of text messages (or text message conversations), the electronic device 102 may determine 1210 if the number of calls is equal to the number of text messages. If the number of calls is equal to the number of text messages, the electronic device 102 may rank 1212 the "phone call" action relative to the "text message" action based on a default setting. For example, a default setting may indicate whether to rank a "phone call" action above or below a "text message" action. In some configurations, the default setting may be predetermined. Additionally or alternatively, the default setting may be configurable. For example, the default setting may be a part of the user preference setting.

If the number of calls is not equal to the number of text messages or text message conversations (indicating that the number of calls is less than the number of text messages (or text message conversations), for instance), the electronic device 102 may rank 1214 the "phone call" action lower than the "text message" action.

The electronic device 102 may rank an "add to contacts" action relative to the "phone call" action and the "text message" action based on whether the phone number is in the contacts and based on action usage history. For example, the electronic device 102 may determine whether the phone number is already stored in contact information on the electronic device 102. If the phone number is already in the contacts, the electronic device 102 may rank 1216 the "add to contacts" action below the "phone call" action and the "text message" action or optionally remove the "add to contacts" action from consideration as a potential action. If the phone number is not in the contacts, the electronic device 102 may compare the action usage history of the "add to contacts" action versus that of the "phone call" action and the "text message" action. For example, the action usage history may indicate how likely performance of the "add to contacts" action is (when the phone number isn't in contacts) relative to the "phone call" action and the "text message" action. The electronic device 102 may accordingly rank the "add to contacts" action, the "phone call" action and the "text message" action. For example, if an unknown phone number is most often called, adding the phone number to contacts is performed less often and sending a text message to the phone number is performed even less often, the electronic device 102 may rank the "phone call" action first, the "add to contacts" action second and the "text message" action third.

The electronic device 102 may optionally communicate 1218 one or more actions based on the ranking. For instance, assuming that there is enough display space, the electronic device 102 may display a list of three actions: "phone call," "add to contacts" and "text message." In accordance with the foregoing example, if the "phone call" action is ranked first, the electronic device 102 may display "phone call" at the top of the list and so on. In some configurations, the electronic device 102 may also display an "other" option on the list. In some configurations, communicating 1218 may be based on a received input. For example, if a recognized object is tapped on a touch screen, the electronic device 102 may display the one or more actions on the touch screen.

The electronic device 102 may optionally receive 1220 a user input. For example, the electronic device 102 may receive a touch input indicating an action. The action may be one of the actions or may be another action.

The electronic device 102 may determine 1222 whether to perform the "phone call" action, the "text message" action, the "add to contacts" action or another action. For example, a highest ranked action may be performed and/or a received 1220 user input may indicate one of the actions or another action.

If the "phone call" action is determined, the electronic device 102 may launch 1224 the phone application and pass the phone number (e.g., paste the phone number) to the phone application. In some configurations, the electronic device 102 may await a "send" input before calling the phone number. In other configurations, the electronic device 102 may directly proceed to call the phone number upon determining the "phone call" action (without waiting for an additional "send" input, for example).

If the "text message" action is determined, the electronic device 102 may launch 1226 the text message application and pass the phone number (e.g., paste the phone number) to the text message application. If the "add to contacts" action is determined, the electronic device 102 may launch 1228 the contacts application and pass the phone number (e.g., paste the phone number) to the contacts application.

If another action is determined, the electronic device 102 may launch 1230 the specified application and add a new action and/or application to the application database. For example, if the device opens another application (based on received input, for example) than one of those corresponding to a determined action and uses the phone number in that application, the electronic device 102 may add the new action/application to the application database. In this way, the electronic device 102 may consider the new action/application the next time a phone number is detected. For example, if the user selects the "other" option on the list and/or opens a video chat application, the electronic device 102 may add a "video chat" action to the application database. Regardless of the action selected, the electronic device 102 may update the usage action history in accordance with the selected and/or performed action.

Figure 13:
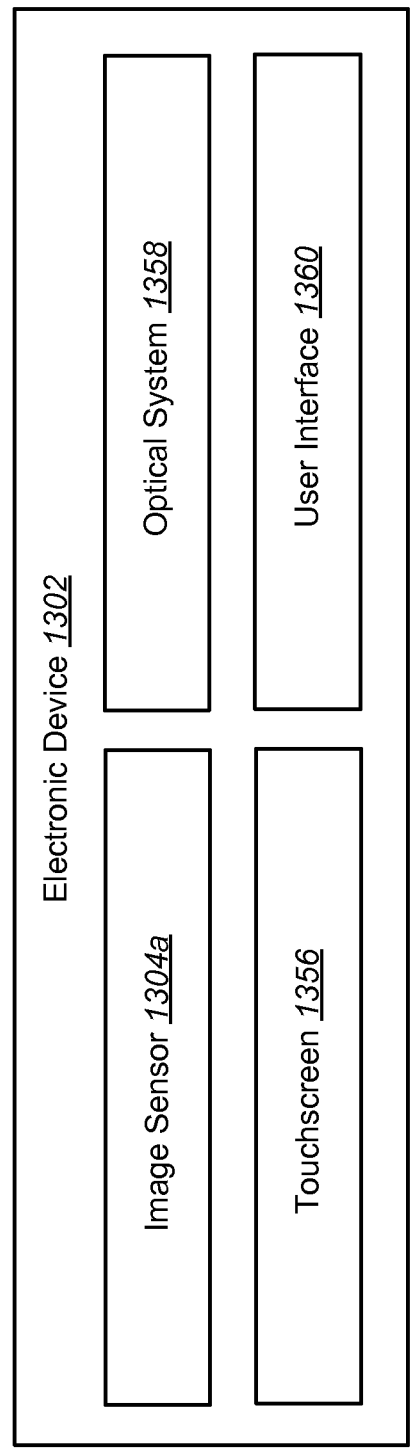
FIG. 13 is a block diagram illustrating another configuration of an electronic device in which systems and methods for context-aware application control may be implemented.

FIG. 13 is a block diagram illustrating another configuration of an electronic device 1302 in which systems and methods for context-aware application control may be implemented. The electronic device 1302 may be one example of the electronic device 102 described in connection with FIG. 1.

An electronic device 1302, such as a smartphone or tablet computer, may include a camera. The camera may include an image sensor 1304a and an optical system 1358 (e.g., lenses) that focuses images of objects that are located within the optical system's 1358 field of view onto the image sensor 1304a. An electronic device 1302 may also include a camera software application and a display screen. When the camera application is running, images of objects that are located within the optical system's 1358 field of view may be captured by the image sensor 1304a. The images that are being captured by the image sensor 1304a may be displayed on the display screen. These images may be displayed in rapid succession at a relatively high frame rate so that, at any given moment in time, the objects that are located within the optical system's 1358 field of view are displayed on the display screen. Although the present systems and methods are described in terms of captured video frames, the techniques discussed herein may be used on any digital image. Therefore, the terms video frame and image (e.g., digital image) may be used interchangeably herein.

A user interface 1360 of the camera application may permit a user to interact with the electronic device 1302 (using a touchscreen 1356, for instance). For example, the user interface 1360 may allow a user to select a specific application to forward object detection results to.

Figure 14:
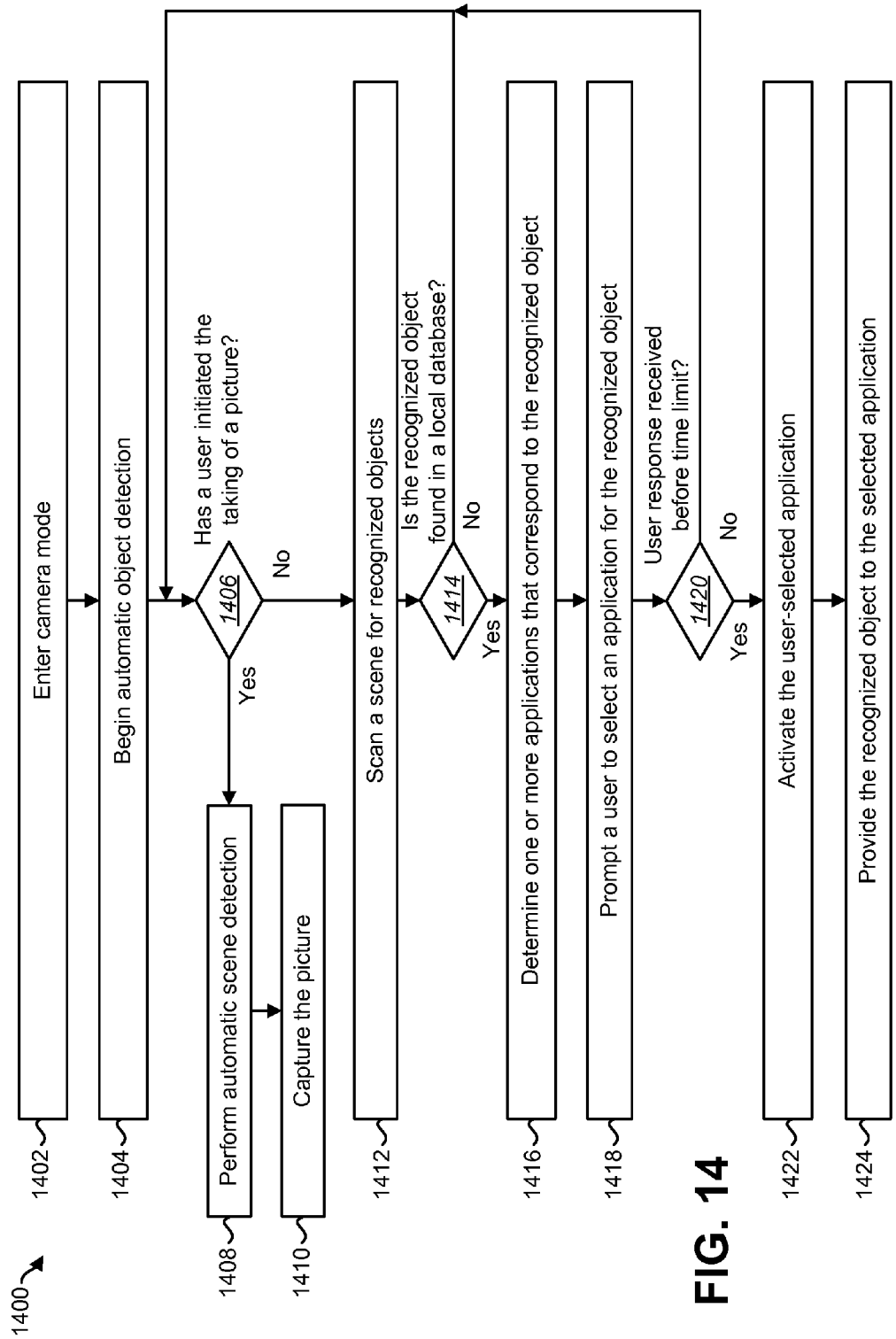
FIG. 14 is a flow diagram of a method for automatic object detection and forwarding that may be utilized in an approach for context-aware application control.

FIG. 14 is a flow diagram of a method 1400 for automatic object detection and forwarding that may be utilized in an approach for context-aware application control. In some configurations, the method 1400 may be performed by one or more of the electronic devices 102, 302, 1302 described herein. For example, the method 1400 may be performed by an electronic device that an image sensor or camera. The electronic device 102 may enter 1402 camera mode. For example, the electronic device 102 may enter camera mode directly from locked mode (e.g., using a camera button on the electronic device 102). As another example, the electronic device 102 may enter the camera mode using an operating system on the electronic device 102 (e.g., selecting a camera application on a touchscreen of the electronic device 102).

The electronic device 102 may begin 1404 automatic object detection. The automatic object detection may include using the camera to read the contents from a preview (i.e., from the scene captured by the camera). For example, the automatic object detection may scan the preview for known objects (such as a business card, a paycheck, a face of a contact, a celebrity, etc.). As technology shifts to more smart cameras, benefits may be realized by an electronic device 102 that is aware of the contents on the screen. For example, the camera can detect and understand why/what the camera is seeing. The object detection may make use of technologies present on the electronic device 102 such as text detection and recognition, face recognition, whiteboard detection and traffic sign detection to better serve as a connection between the outside world and the digital world. Thus, the electronic device 102 may scan objects and automatically forward the observed contents to the specific application that will use those contents.

The automatic object detection may optionally occur when the camera application is open and scanning (e.g., when a picture is not being taken by the camera). Thus, the electronic device 102 may determine 1406 whether a user has initiated the taking of a picture during the automatic object detection. If the user initiates the taking of a picture, the automatic object detection may halt so that the electronic device 102 can perform 1408 automatic scene detection and then capture 1410 the picture. It should be noted that in some configurations, the method 1400 may be performed whether a picture is being taken or whether the electronic device 102 is capturing preview frames.

If the user has not initiated the taking of a picture, the electronic device 102 may scan 1412 a scene for recognized objects. As discussed above, scanning a scene for recognized objects may include scanning for text, facial recognition, whiteboard detection and traffic sign detection, for example.

The electronic device 102 may compare the results with a local database. The electronic device 102 may determine 1414 whether the recognized object is found in the local database. If the recognized object is not found in the local database, the electronic device 102 may return to performing automatic detection (by ensuring that a user has not initiated the taking of a picture). Thus, in one configuration, the electronic device 102 may compare an object (e.g., a face, a barcode, text or other object) with information stored in a local database (e.g., a contact list, an image gallery, a barcode type database) to identify a class (e.g., face, business card, barcode) of the object. The class of the object may then be used to determine 1416 which applications can use the object.

If the recognized object is found in the local database, the electronic device 102 may determine 1416 one or more applications that correspond to the recognized object. For example, if a face is recognized, the electronic device 102 may access an application that includes celebrity images to search for whether the face is that of a celebrity. As another example, if a face is recognized, the electronic device 102 may access the contacts listing to determine whether the recognized face is that of a contact already stored in the contacts listing. The electronic device 102 may prompt 1418 the user of the one or more applications that can use the recognized object. If a response is not received 1420 before a time limit, the electronic device 102 may determine whether the user has initiated the taking of a picture.

If a response to the prompt is received 1420 before the time limit, the electronic device 102 may activate 1422 the user selected application. The electronic device 102 may provide 1424 the recognized object to the selected application.

Figure 15:
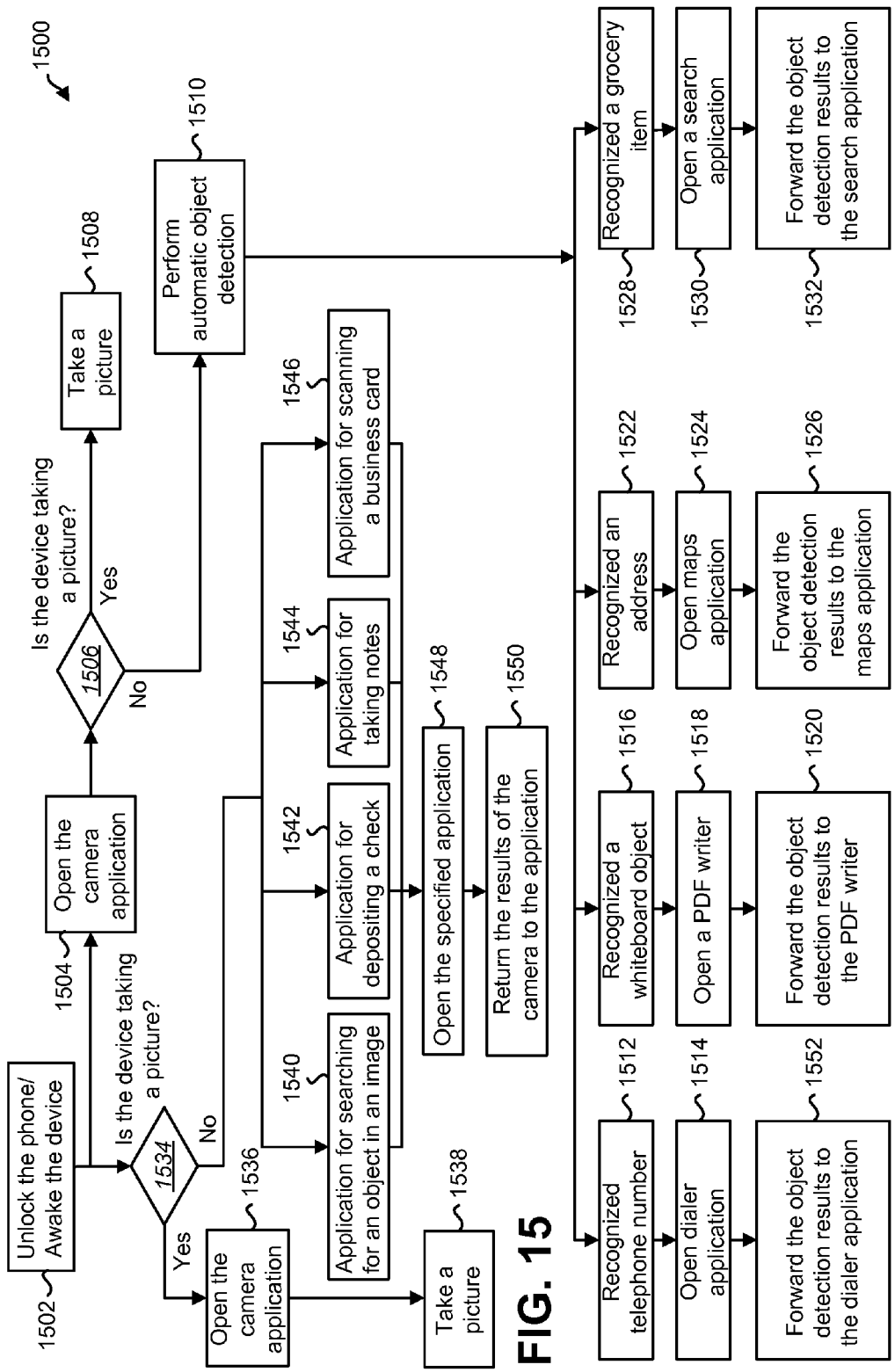
FIG. 15 is a flow diagram of another method for automatic object detection and forwarding that may be utilized in an approach for context-aware application control.

FIG. 15 is a flow diagram of another method 1500 for automatic object detection and forwarding that may be utilized in an approach for context-aware application control. The method 1500 may be performed by one or more of the electronic devices 102, 302, 1302 described herein. The electronic device 102 may be awakened 1502 (e.g., move from a locked state to an unlocked state). Typically, if the device is taking 1534 a picture, the user may open 1536 the camera application and then take 1538 a picture. In another typical procedure, when the device is not taking 1534 a picture, the user may also open another application prior to taking a picture. For example, the user may open an application 1540 for searching for an object in an image, an application 1542 for depositing a check, an application 1544 for taking notes or an application 1546 for scanning a business card. Once the user has opened 1548 the specified application, the user may be directed to open the camera application and take a photograph. The results of the photograph may then be returned 1550 to the selected application.

In accordance with the systems and methods disclosed herein, however, it may be desirable to have the electronic device 102 determine one or more applications that correspond to a scene detected by the camera. For example, a user may desire to point the camera at a business card and have the electronic device 102 detect that the camera is pointed at a business card and prompt the user of one or more applications that can be opened to use the business card information.

Upon unlocking the phone or awaking the device, the electronic device 102 may open 1504 the camera application. The electronic device 102 may determine 1506 whether the device is taking a picture. If the device is taking a picture, the automatic object detection may not occur in some configurations and the electronic device 102 may take 1508 a picture. In other configurations, however, object detection may be performed whether or not the electronic device 102 is in the process of taking a picture (e.g., if the camera application is open).

If the device is not taking a picture, the electronic device 102 may perform 1510 automatic object detection. Object detection may include using one or more feature detection capabilities of the electronic device 102 such as facial recognition and text recognition. Depending on the object detected, the electronic device 102 may open a specific application and forward the object detection results to the opened application. For example, if the object detection recognizes 1512 a telephone number, the electronic device 102 may open 1514 a dialer application and forward 1552 the object detection results to the dialer application. As another example, if the object detection recognizes 1516 a whiteboard object, the electronic device 102 may open 1518 a Portable Document Format (PDF) writer and forward 1520 the object detection results to the open PDF writer. In yet another example, if the object detection recognizes 1522 an address, the electronic device 102 may open 1524 a maps application and forward 1526 the object detection results to the maps application. In another example, if the object detection recognizes 1528 a grocery item, the electronic device 102 may open 1530 a search application and forward 1532 the object detection results to the search application.

Figure 16:
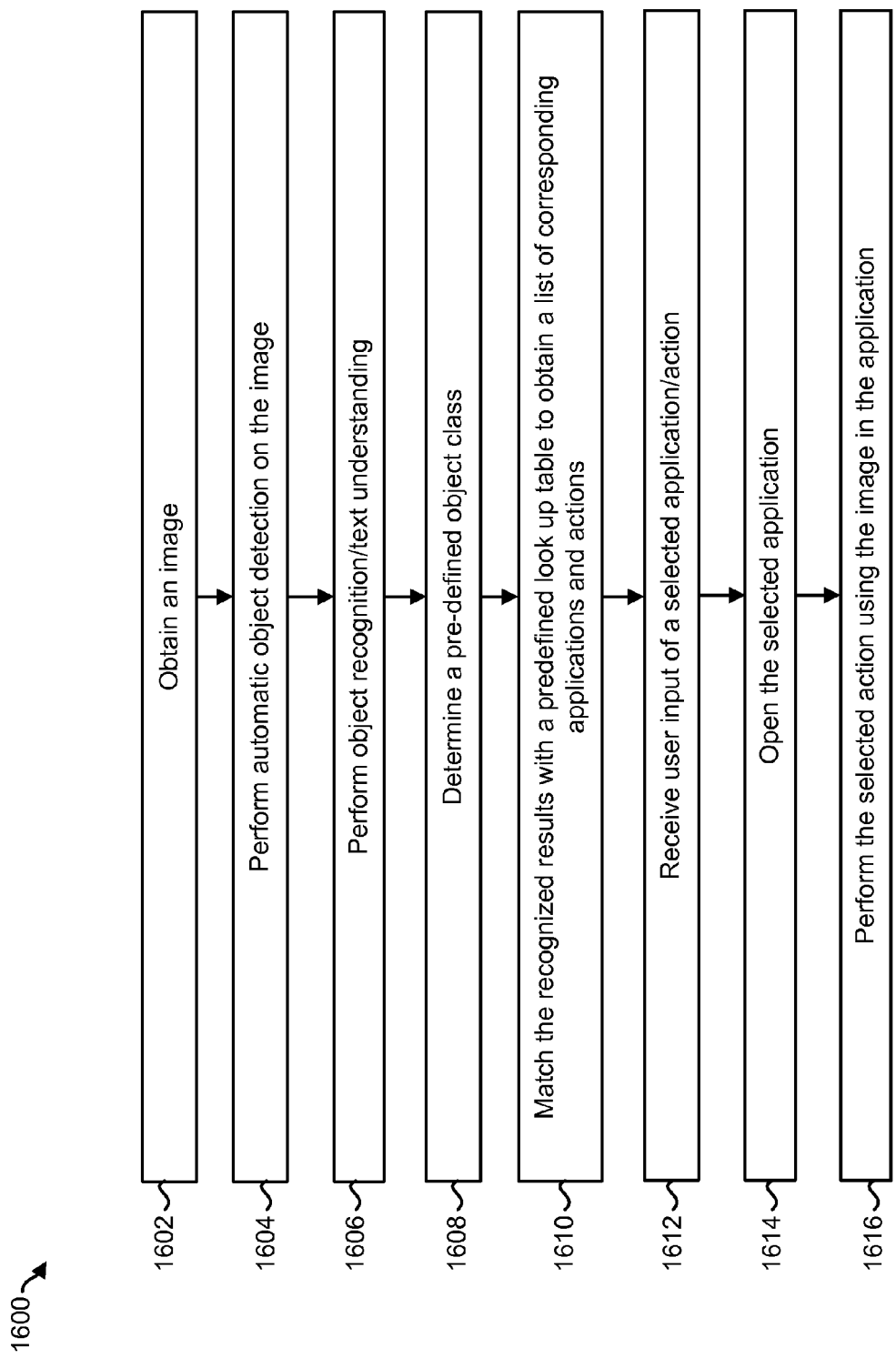
FIG. 16 is a flow diagram of yet another method for automatic object detection and forwarding that may be utilized in an approach for context-aware application control.

FIG. 16 is a flow diagram of yet another method 1600 for automatic object detection and forwarding that may be utilized in an approach for context-aware application control. FIG. 16 provides one specific example for automatic object detection and forwarding when the object detected is text. The method 1600 may be performed by an electronic device 102. The electronic device 102 may obtain 1602 an image. The electronic device 102 may perform 1604 automatic object detection on the image. The electronic device 102 may perform 1606 object recognition/text understanding. For example, the electronic device 102 may determine the action(s) and/or application(s) that the object corresponds to.

The electronic device 102 may determine 1608 a predefined object class or category. The electronic device 102 may match 1610 the recognized results with a predefined look up table to obtain a list of corresponding applications and actions. The electronic device 102 may optionally receive 1612 user input of a selected application/action. Optionally based on the user input, the electronic device 102 may open 1614 the selected application and perform 1616 the selected action using the image in the application.

Figure 17:
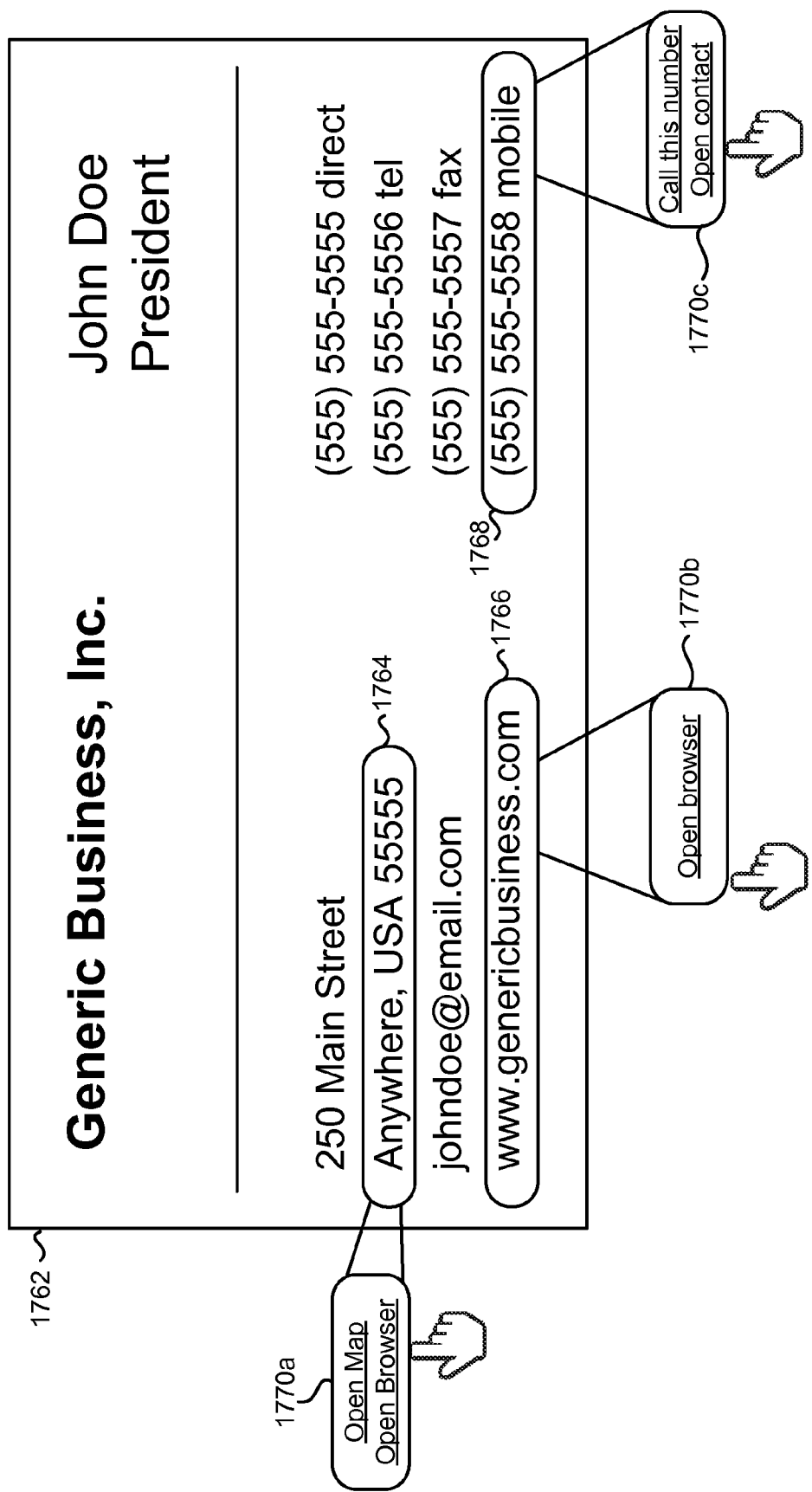
FIG. 17 illustrates an example of context-aware application control for a business card.

FIG. 17 illustrates an example of context-aware application control for a business card 1762. The business card 1762 illustrated may include multiple objects that are detected by the automatic object detection. For example, a map address 1764, a web address 1766 and a phone number 1768 may be detected using text recognition. In some configurations, the user may be prompted to select one of the actions/applications for detected objects. For example, for the map address 1764, the user may be prompted to select from actions 1770*a* of either opening the map or opening the browser. If the user selects opening the map for the physical address, the maps application may open and the results of the automatic object detection (i.e., the detected physical address) may be forwarded to the maps application. If the user selects opening the browser for the physical address, the browser application may be opened and the physical address text may be forwarded to the browser application.

If the user selects an action 1770*b* of opening the browser for the web address 1766, the browser application may be opened and the web address 1766 may be forwarded to the browser. If the user selects an action 1770*c* of opening the dialer for a detected phone number 1768, the dialer application may be opened and the detected phone number 1768 may be forwarded to the dialer application. If the user selects an action 1770*c* of opening the contact list for a detected phone number 1768, the contacts application may open and the detected phone number 1768 may be forwarded to the contacts application.

In some configurations, each detected object 1764, 1766, 1768 may only be emphasized (e.g., highlighted, underlined and/or circled as illustrated in FIG. 17) initially. If an input is received that indicates one or more of the objects 1764, 1766, 1768, the potential actions may be communicated (e.g., displayed, as in the bubbles illustrated in FIG. 17, for example).

Figure 18:
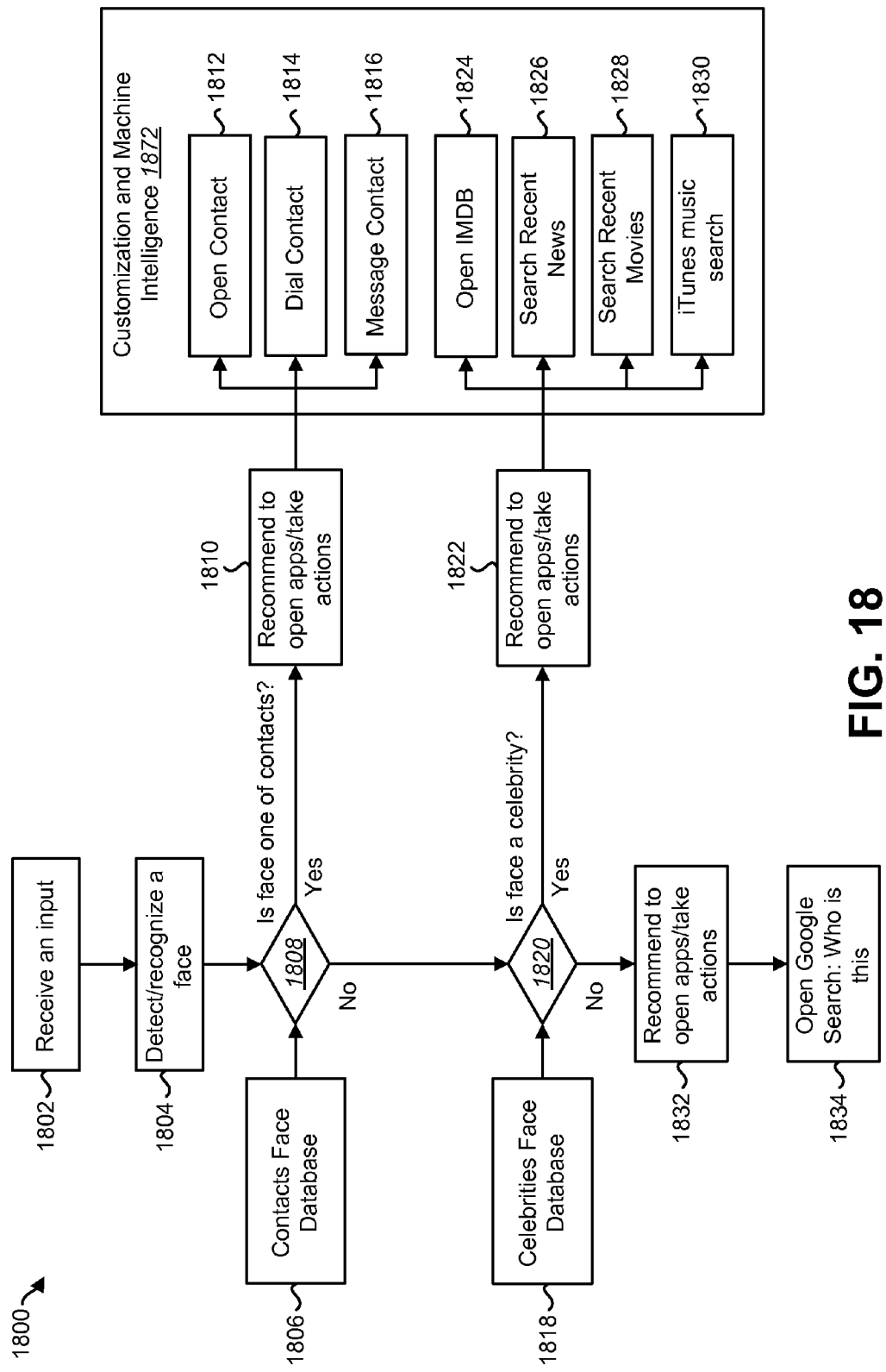
FIG. 18 is a flow diagram illustrating an example of a method of automatic object detection and forwarding with facial recognition that may be utilized in an approach for context-aware application control.

FIG. 18 is a flow diagram illustrating an example of a method 1800 of automatic object detection and forwarding with facial recognition that may be utilized in an approach for context-aware application control. The method 1800 may be performed by one or more of the electronic devices 102, 302, 1302 described herein. For example, one or more steps of the method 1800 may be performed by the context-aware application controller 154. The electronic device 102 may receive 1802 an input (e.g., a scene detected by the camera). The electronic device 102 may detect/recognize 1804 a face from the input.

The electronic device 102 may determine 1808 whether the detected face is that of one of the contacts on the electronic device 102 (by using a contacts face database 1806). If the detected face is one of the contacts in the contacts face database, the electronic device 102 may prompt the user by recommending 1810 applications/actions to be taken. For example, a customization and machine intelligence module 1872 may be used to prompt the user to open 1812 the contact of the detected face, dial 1814 the contact of the detected face or message 1816 the contact of the detected face.

If the face in the input is not the face of a contact stored in the contacts face database, the electronic device 102 may determine 1820 whether the detected face is that of a celebrity (using a celebrity face database 1818). If the detected face is that of a celebrity, the electronic device 102 may prompt the user by recommending 1822 applications/actions to be taken. For example, the customization and machine intelligence module 1872 may be used to prompt the user to open 1824 the Internet Movie Database (IMDB) to search for the profile of the detected celebrity, to search 1826 for recent news concerning the detected celebrity, to search 1828 for recent movies corresponding to the detected celebrity or to perform a search 1830 of music (e.g., an iTunes music search) corresponding to the detected celebrity.

If the face in the input is not that of a recognized celebrity, the electronic device 102 may prompt the user by recommending 1832 applications/actions to be taken. For example, the electronic device 102 may prompt the user to open 1834 a google search to find the detected face.

Figure 19:
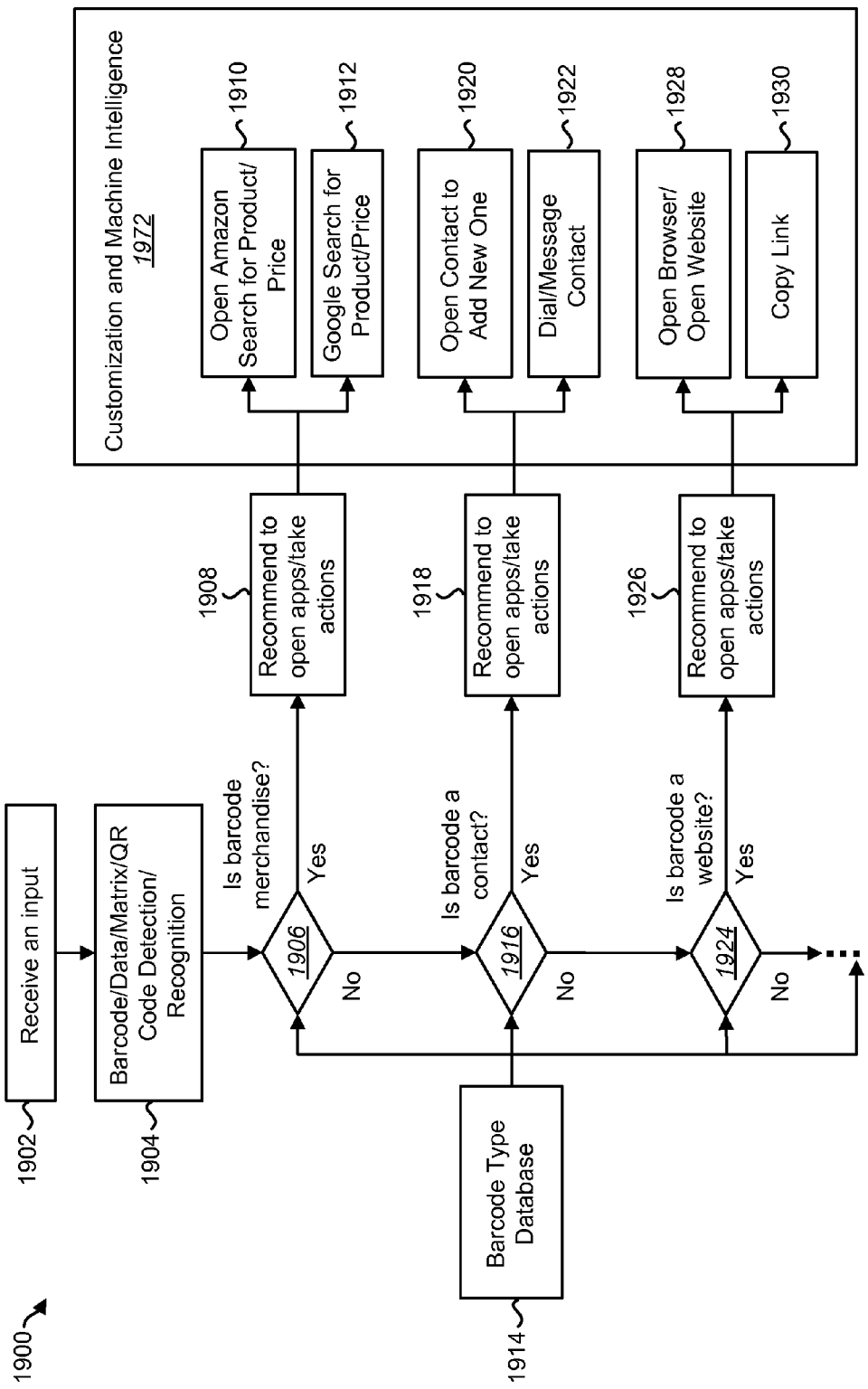
FIG. 19 is a flow diagram of a method for using automatic object detection and forwarding with recognizing a barcode that may be utilized in an approach for context-aware application control.

FIG. 19 is a flow diagram of a method 1900 for using automatic object detection and forwarding with recognizing a barcode that may be utilized in an approach for context-aware application control. The method 1900 may be performed by one or more of the electronic devices 102, 302, 1302 described herein. For example, one or more steps of the method 1900 may be performed by the context-aware application controller 154. The electronic device 102 may receive 1902 an input (i.e., an image from the camera). The electronic device 102 may perform 1904 object detection resulting in a detected barcode/data/matrix/QR code being recognized. The electronic device 102 may determine 1906 whether the barcode is merchandise using a barcode type database. If the barcode is merchandise, the electronic device 102 may prompt the user by recommending 1908 applications to open/actions to take. For example, the electronic device 102 may use a customization and machine intelligence module 1972 to prompt the user to open 1910 an Amazon search for the product/price of the merchandise barcode. As another example, the electronic device 102 may use the customization and machine intelligence module 1972 to prompt the user to perform 1912 a Google search for the product/price of the merchandise barcode.

If the barcode is not merchandise, the electronic device 102 may determine 1916 whether the barcode is a contact using the barcode type database 1914. If the barcode is a contact, the electronic device 102 may prompt the user by recommending 1918 applications/actions to take. For example, the electronic device 102 may use the customization and machine intelligence module 1972 to open 1920 the contacts application to add a new contact or to dial/message 1922 the contact.

If the barcode is not a contact, the electronic device 102 may determine 1924 whether the barcode is a website using the barcode type database 1914. If the barcode is a website, the electronic device 102 may prompt the user by recommending 1926 applications/actions to take. For example, the electronic device 102 may use the customization and machine intelligence module 1972 to open 1928 a browser/open a website corresponding to the website barcode. As another example, the electronic device 102 may copy 1930 the link of the barcode website for use in other applications. If the barcode is not a website, the electronic device 102 may continue searching to determine the type of the barcode and/or applications/actions that can be taken to use the barcode.

Figure 20:
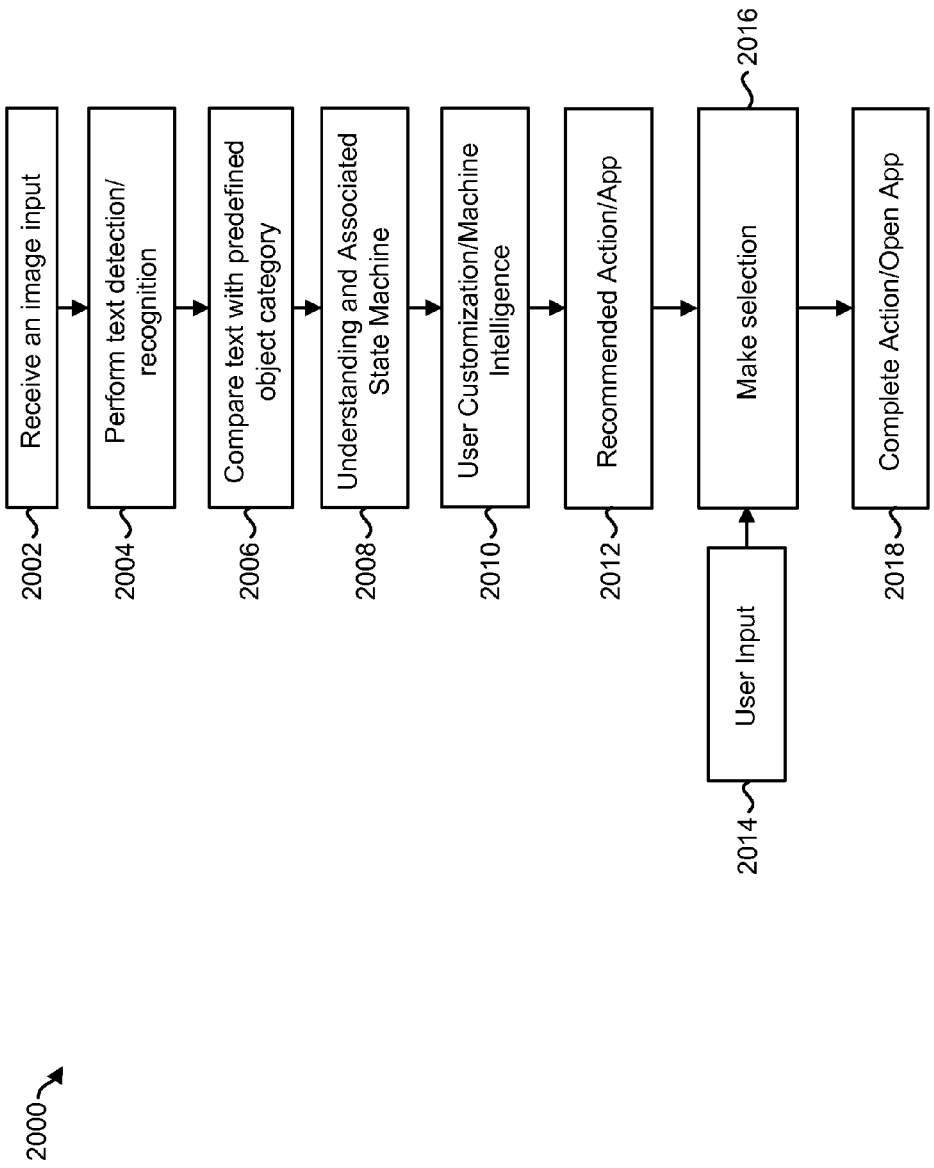
FIG. 20 is a flow diagram of a method for using automatic object detection and forwarding for optical character recognition (OCR) that may be utilized in an approach for context-aware application control.

FIG. 20 is a flow diagram of a method 2000 for using automatic object detection and forwarding for optical character recognition (OCR) that may be utilized in an approach for context-aware application control. The method 2000 may be performed by one or more of the electronic devices 102, 302, 1302 described herein. For example, one or more steps of the method 2000 may be performed by the context-aware application controller 154. The electronic device 102 may receive 2002 an image input. The electronic device 102 may perform 2004 text detection/recognition on the image. The electronic device 102 may compare 2006 the detected text with one or more predefined object classes or categories. An understanding and associated state machine may be used to determine 2008 one or more applications/actions to suggest to a user for the detected text. For example, the electronic device 102 may use user customization/machine intelligence to determine 2010 the recommended 2012 or actions/applications. Optionally based on user input 2014, the electronic device 102 may select 2016 the appropriate action/application for the detected text. The electronic device 102 may then complete 2018 the action/open the application and forward the detected text to the opened application.

Figure 21:
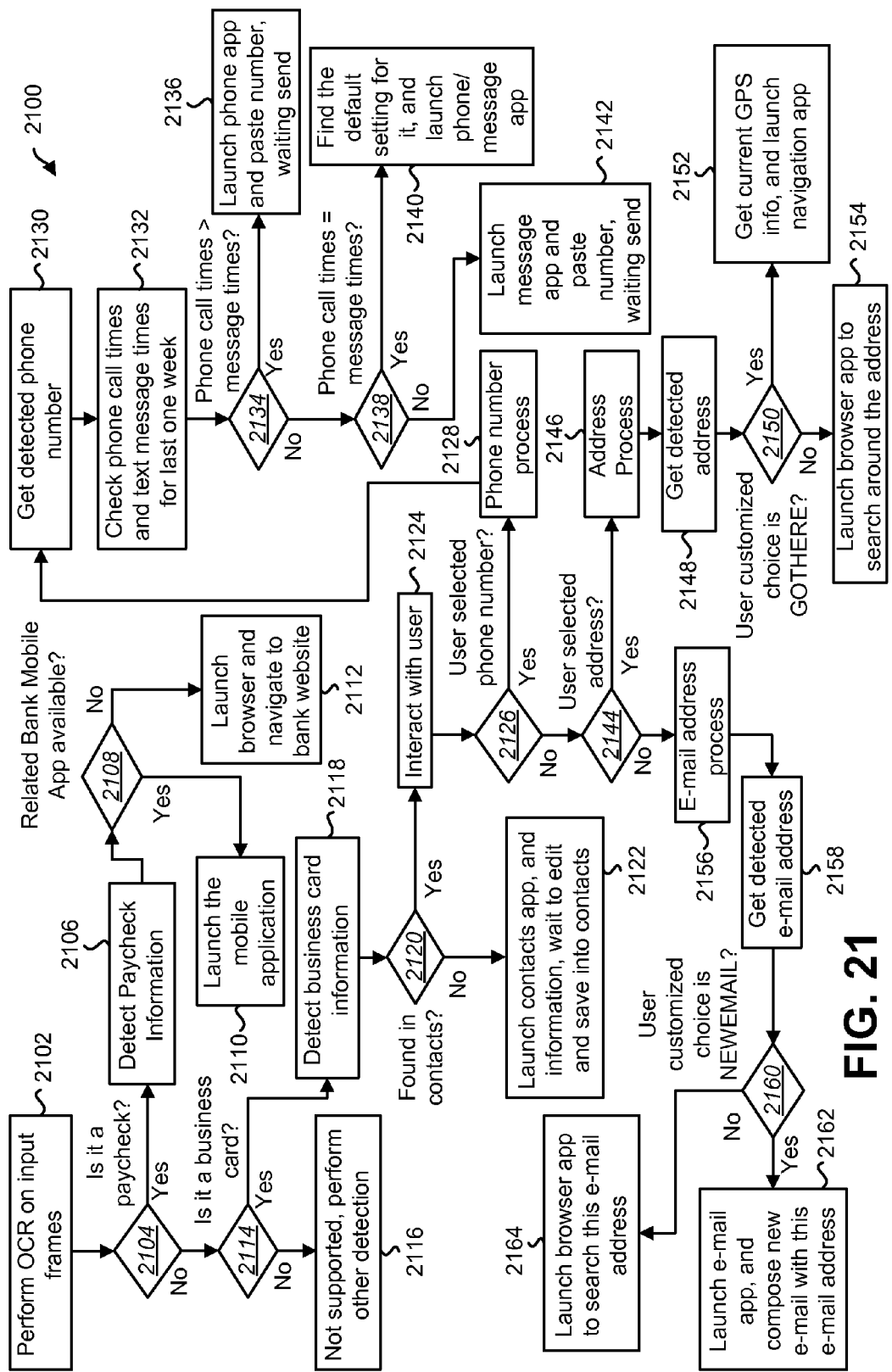
FIG. 21 is a flow diagram of an example of another method for using automatic object detection and forwarding for OCR that may be utilized in an approach for context-aware application control.

FIG. 21 is a flow diagram of an example of another method 2100 for using automatic object detection and forwarding for optical character recognition (OCR) that may be utilized in an approach for context-aware application control. The method 2100 may be performed by one or more of the electronic devices 102, 302, 1302 described herein. The electronic device 102 may perform 2102 OCR on the input frames. The electronic device 102 may determine 2104 whether the detected text is a paycheck. If the detected text is a paycheck, the electronic device 102 may detect 2106 the paycheck information. The electronic device 102 may determine 2108 whether a related bank mobile application is available on the electronic device 102. If a related bank mobile application is available, the electronic device 102 may launch 2110 the mobile application and forward the paycheck information to the mobile application. If a related bank mobile application is not available, the electronic device 102 may launch 2112 the browser and navigate to the bank website. The electronic device 102 may then forward the detected paycheck information to the bank website. In some configurations, launching 2110 the mobile application and/or launching 2112 the browser may be conditioned on a user input. For example, options for launching 2110 the mobile application and launching 2112 the browser may be presented on a touchscreen and may be performed when a user input indicates the option. In other configurations, the electronic device 102 may automatically proceed to take one of these actions. For example, a user may indicate (as recorded in a user preference setting, for example) that for a detected paycheck, the electronic device 102 should automatically proceed to launch 2110 the mobile application or launch 2112 the browser.

If the detected text is not a paycheck, the electronic device 102 may determine 2114 whether the detected text is a business card. If the detected text is not a business card, the electronic device 102 may determine 2114 that the detected text is not supported 2116 and perform other detections. If the detected text is a business card, the electronic device 102 may detect 2118 the business card information. The electronic device 102 may determine 2120 whether the business card information is found in the contacts. If the business card information is not found in the contacts, the electronic device 102 may launch 2122 the contacts application. The electronic device 102 may forward the business card information to the contacts application and wait to edit and save the business card information into the contacts. In some configurations, launching 2122 the contacts application may be conditioned on a user input. For example, an option for launching 2122 the contacts application may be presented on a touchscreen and may be performed when a user input indicates the option. In other configurations, the electronic device 102 may automatically proceed to launch 2122 the contacts application. For example, a user may indicate (as recorded in a user preference setting, for example) that for a detected business card, the electronic device 102 should automatically proceed to launch 2122 the contacts application.

If the business card information is found in the contacts, the electronic device 102 may interact 2124 with the user. For example, if the user selects 2126 a phone number, the electronic device 102 may begin 2128 the phone number process. The electronic device 102 may get 2130 the detected phone number. The electronic device 102 may check 2132 the number of phone calls and number of text messages (or number of text conversations, for example) for the last one week. If it is determined 2134 that the number of phone calls is greater than the number of text messages (or text message conversations, for example), the electronic device 102 may launch 2136 the phone application and forward the phone number to the phone application. The electronic device 102 may then wait for the user to initiate the phone call.

If it is determined 2138 that the number of phone calls is equal to the number of text messages (or number of text message conversations, for example), the electronic device 102 may find the default setting for the phone number (either initiate phone call or initiate text message) and then open (e.g., launch 2140) the corresponding application. The electronic device 102 may forward the phone number to the opened application.

If the number of phone calls is less than the number of text messages (or text message conversations, for example), the electronic device 102 may launch 2142 the messaging application. The electronic device 102 may forward the phone number to the messaging application and wait for the user to initiate the sending of a text message. In some configurations, launching 2136, 2140 the phone application or launching 2140, 2142 the message application may be conditioned on a user input. For example, options for launching 2136, 2140 the phone application or launching 2140, 2142 the message application may be presented on a touchscreen and may be performed when a user input indicates the option. In other configurations, the electronic device 102 may automatically proceed to take one of these actions. For example, a user may indicate (as recorded in a user preference setting, for example) that for a phone call or text message, the electronic device 102 should automatically proceed to launch 2136, 2140 the phone application or launch 2140, 2142 the message application.

If the user selects 2144 an address from the business card information, the electronic device 102 may begin 2146 the address process. The electronic device 102 may get 2148 the detected address. If the user customized choice 2150 is GOTHERE, the electronic device 102 may launch 2152 the navigation application. The electronic device 102 may then forward the detected address to the navigation application and begin a navigation procedure. If the user customized choice 2150 is not GOTHERE, the electronic device 102 may launch 2154 the browser application. The electronic device 102 may forward the detected address to the browser application and search for the address using the browser application.

If the user selects 2144 an email from the business card information (e.g., and does not select 2144 the street address), the electronic device 102 may begin 2156 the email address process. The electronic device 102 may get 2158 the detected email address from the business card information. If the user customized choice 2160 is to begin a new email, the electronic device 102 may launch 2162 the email application and perform the action of beginning to compose a new email to the email address detected on the business card. Thus, the electronic device 102 may forward the email address to the email application. If the user customized choice 2160 is not to begin a new email, the electronic device 102 may launch 2164 the browser application to search for the email address. Thus, the electronic device 102 may forward the email address to the browser application.

Figure 22:
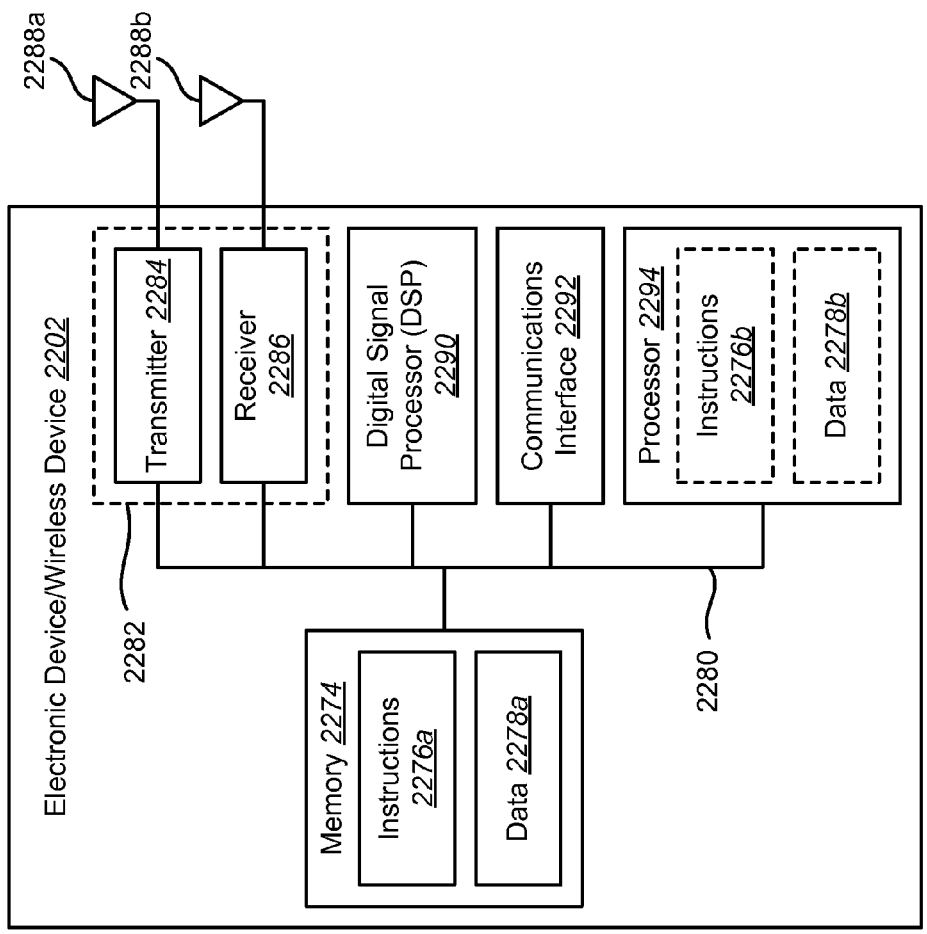
FIG. 22 illustrates certain components that may be included within an electronic device and/or wireless device.

FIG. 22 illustrates certain components that may be included within an electronic device and/or wireless device 2202. The electronic device/wireless device 2202 may be an access terminal, a mobile station, a user equipment (UE), a smartphone, a digital camera, a video camera, a tablet device, a laptop computer, etc. The electronic device/wireless device 2202 may be implemented in accordance with one or more of the electronic devices 102, 302, 1302 described in connection with one or more of FIGS. 1, 3 and 13. The electronic device/wireless device 2202 includes a processor 2294. The processor 2294 may be a general purpose single- or multi-chip microprocessor (e.g., an ARM), a special purpose microprocessor (e.g., a digital signal processor (DSP)), a microcontroller, a programmable gate array, etc. The processor 2294 may be referred to as a central processing unit (CPU). Although just a single processor 2294 is shown in the electronic device/wireless device 2202, in an alternative configuration, a combination of processors (e.g., an ARM and DSP) could be used.

The electronic device/wireless device 2202 also includes memory 2274. The memory 2274 may be any electronic component capable of storing electronic information. The memory 2274 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 2278a and instructions 2276a may be stored in the memory 2274. The instructions 2276a may be executable by the processor 2294 to implement one or more of the methods 200, 1100, 1200, 1400, 1500, 1600, 1800, 1900, 2000, 2100 described herein. Executing the instructions 2276a may involve the use of the data 2278a that is stored in the memory 2274. When the processor 2294 executes the instructions 2276, various portions of the instructions 2276b may be loaded onto the processor 2294, and various pieces of data 2278b may be loaded onto the processor 2294.

The electronic device/wireless device 2202 may also include a transmitter 2284 and a receiver 2286 to allow transmission and reception of signals to and from the electronic device/wireless device 2202. The transmitter 2284 and receiver 2286 may be collectively referred to as a transceiver 2282. Multiple antennas 2288a-b may be electrically coupled to the transceiver 2282. The electronic device/wireless device 2202 may also include (not shown) multiple transmitters, multiple receivers, multiple transceivers and/or additional antennas.

The electronic device/wireless device 2202 may include a digital signal processor (DSP) 2290. The electronic device/wireless device 2202 may also include a communications interface 2292. The communications interface 2292 may enable one or more kinds of input and/or output. For example, the communications interface 2292 may include one or more ports and/or communication devices for linking other devices to the electronic device/wireless device 2202. Additionally or alternatively, the communications interface 2292 may include one or more other interfaces (e.g., touchscreen, keypad, keyboard, microphone, camera, etc.). For example, the communication interface 2292 may enable a user to interact with the electronic device/wireless device 2202.

The various components of the electronic device/wireless device 2202 may be coupled together by one or more buses, which may include a power bus, a control signal bus, a status signal bus, a data bus, etc. For the sake of clarity, the various buses are illustrated in FIG. 22 as a bus system 2280.

Figure 23:
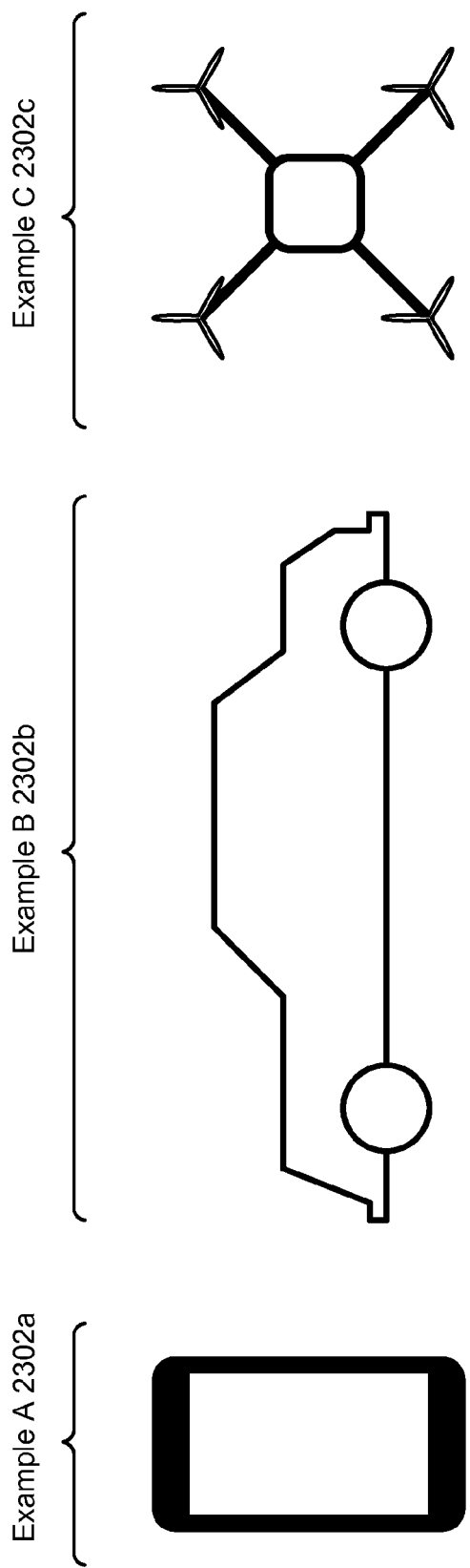
FIG. 23 illustrates examples of electronic devices in which systems and methods for context-aware application control may be implemented.

FIG. 23 illustrates examples 2302a-c of electronic devices in which systems and methods for context-aware application control may be implemented. Example A 2302a is a wireless communication device (e.g., smartphone, tablet device, etc.). Example B 2302b is an automobile. Example C is an unmanned aerial vehicle (e.g., UAV, drone, etc.).

One or more of the electronic devices 102, 302, 1032, 2202 described herein may be implemented as (or included within) example A 2302a, example B 2302b and/or example C 2302c. Additionally or alternatively, one or more of the methods 200a, 200b, 1100, 1200, 1400, 1500, 1600, 1800,

1900, 2000, 2100, operations, procedures, functions and/or steps described herein may be performed by one or more of example A 2302*a*, example B 2302*b* and/or example C 2302*c*. Additionally or alternatively, one or more of the components and/or elements described herein may be implemented in one or more of example A 2302*a*, example B 2302*b* and/or example C 2302*c*.

For instance, example A 2302*a* (e.g., a smartphone) may perform one or more of the operations described above, such as adding a contact when a business card is recognized or running a music application when a user is jogging. In another instance, example B 2302*b* (an automobile) may open a maps application when driving along a particular route, may warn a user of a speed change when a lower speed limit sign is recognized and/or may play an alarm when the car is drifting off of a road. In another instance, example C 2302*c* (a UAV) may capture video when people are recognized. Many other examples may be implemented in accordance with the systems and methods disclosed herein. For instance, the systems and method disclosed herein could be implemented in a robot that performs one or more actions (e.g., fetching something, assembling something, searching for an item, etc.) based on contextual information.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. It should also be noted that one or more steps of a method described herein may be substituted for one or more steps of another method described herein. Additionally or alternatively, one or more modules of an electronic device described herein may be substituted for one or more modules of another electronic device described herein. It should be further noted that additional or fewer steps may be utilized in any of the methods described herein and/or additional or fewer modules may be implemented in any of the electronic devices described herein.

Further, it should be appreciated that modules and/or other appropriate means for performing the methods and techniques described herein, such as those illustrated by FIGS. 1-16 and 18-21 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by an electronic device, comprising:
   obtaining sensor information;
   identifying a class of an object based on the sensor information;
   determining one or more actions based on the sensor information, the class of the object and an action usage history; and
   performing at least one of the one or more actions based on at least one application.

2. The method of claim 1, wherein performing at least one of the one or more actions comprises at least one of running a dialer application, running a text message application and running a contacts application when the class of the object is a phone number.

3. The method of claim 1, wherein performing at least one of the one or more actions comprises running a browser application when the class of the object is a Uniform Resource Locator (URL).

4. The method of claim 1, wherein performing at least one of the one or more actions comprises running a map application when the class of the object is an address.

5. The method of claim 1, wherein performing at least one of the one or more actions comprises running an e-mail application when the class of the object is an e-mail address.

6. The method of claim 1, wherein performing at least one of the one or more actions comprises running a note application when the class of the object is generic text.

7. The method of claim 1, wherein performing at least one of the one or more actions comprises running a document writer application when the class of the object is a whiteboard object.

8. The method of claim 1, wherein the sensor information comprises at least one of image information, location information, motion information, and ambient light information.

9. The method of claim 1, wherein the sensor information comprises image information, wherein the method further comprises performing object detection based on the image information to indicate the object.

10. The method of claim 1, wherein performing at least one of the one or more actions comprises selecting, from a database, one or more highest ranked actions.

11. The method of claim 1, wherein determining the one or more actions is further based on temporal information.

12. The method of claim 1, wherein the action usage history comprises a record of actions performed with contextual information.

13. The method of claim 1, further comprising ranking the one or more actions based on the class of the object.

14. The method of claim 13, further comprising ranking the one or more actions based on the action usage history.

15. The method of claim 14, comprising ranking the one or more actions by associating weights based on a number of times an action is performed according to the action usage history and a number of times the class of the object is used to perform the action.

16. An electronic device configured to provide a context-aware application, comprising:
   a processor configured to obtain sensor information, to identify a class of an object based on the sensor information, to determine one or more actions based on the sensor information, the class of the object and an action usage history, and to perform at least one of the one or more actions based on at least one application; and
   a memory in electronic communication with the processor, wherein the memory is configured to store the action usage history.

17. The electronic device of claim 16, wherein the processor is configured to run a search application when the class of the object is a grocery item.

18. The electronic device of claim 16, wherein the processor is configured to run a banking application when the class of the object is banking information.

19. The electronic device of claim 16, wherein the processor is configured to run a payment application when the class of the object is payment information.

20. The electronic device of claim 16, wherein the processor is configured to run at least one of a contacts application, a dialer application, a text messaging application and a search application when the class of the object is a face.

21. The electronic device of claim 16, wherein the processor is configured to run at least one of a search application, a contacts application, a dialer application, a text messaging application and a browser when the class of the object is a barcode.

22. The electronic device of claim 16, wherein the sensor information comprises at least one of image information, location information, motion information, and ambient light information.

23. The electronic device of claim 16, wherein the sensor information comprises image information, wherein the processor is configured to perform object detection based on the image information to indicate the object, and wherein the electronic device comprises a display in electronic communication with the processor, wherein the display is configured to present an image corresponding to the image information.

24. The electronic device of claim 16, wherein the electronic device is a wireless communication device, an automobile, a drone or a robot.

* * * * *